(12) United States Patent
Osaka et al.

(10) Patent No.: US 12,436,355 B2
(45) Date of Patent: Oct. 7, 2025

(54) LENS DRIVE DEVICE, CAMERA MODULE, AND CAMERA MOUNT DEVICE

(71) Applicants: Tomohiko Osaka, Tokyo (JP); Shun Suzuki, Tokyo (JP)

(72) Inventors: Tomohiko Osaka, Tokyo (JP); Shun Suzuki, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 653 days.

(21) Appl. No.: 17/785,463

(22) PCT Filed: Dec. 21, 2020

(86) PCT No.: PCT/JP2020/047620
§ 371 (c)(1),
(2) Date: Jun. 15, 2022

(87) PCT Pub. No.: WO2021/132129
PCT Pub. Date: Jul. 1, 2021

(65) Prior Publication Data
US 2023/0022577 A1 Jan. 26, 2023

(30) Foreign Application Priority Data

Dec. 26, 2019 (JP) ................. 2019-236300

(51) Int. Cl.
| G02B 7/02 | (2021.01) |
| G01D 5/14 | (2006.01) |
| G03B 5/00 | (2021.01) |
| G03B 13/36 | (2021.01) |
| H02N 2/02 | (2006.01) |
| H04N 23/51 | (2023.01) |
| H04N 23/80 | (2023.01) |

(52) U.S. Cl.
CPC ............... *G02B 7/021* (2013.01); *G03B 5/00* (2013.01); *G03B 13/36* (2013.01); *G01D 5/145* (2013.01); *G03B 2205/0046* (2013.01); *G03B 2205/0084* (2013.01); *H02N 2/026* (2013.01); *H04N 23/51* (2023.01); *H04N 23/80* (2023.01)

(58) Field of Classification Search
None
See application file for complete search history.

(56) References Cited

U.S. PATENT DOCUMENTS

| 5,225,941 A | 7/1993 | Saito et al. |
| 6,232,697 B1 | 5/2001 | Mizumoto |
| 2002/0075571 A1 | 6/2002 | Chikami et al. |

(Continued)

FOREIGN PATENT DOCUMENTS

| CN | 102165367 | 8/2011 |
| JP | 51-73409 | 6/1976 |

(Continued)

*Primary Examiner* — Ryan Crockett

(57) ABSTRACT

This lens drive device is provided with: a first movable part; a second movable part; a first drive part; and a second drive part. The first drive part and the second drive part respectively have a first ultrasonic motor and a second ultrasonic motor. The first ultrasonic motor and the second ultrasonic motor are arranged on sides opposite to each other with respect an optical axis, and independently drive the first movable part and the second movable part in the optical axis direction.

20 Claims, 14 Drawing Sheets

(56) References Cited

U.S. PATENT DOCUMENTS

| | | | |
|---|---|---|---|
| 2005/0029876 A1* | 2/2005 | Sasaki | H02N 2/026 |
| | | | 310/323.05 |
| 2010/0067129 A1 | 3/2010 | Ozaki et al. | |
| 2011/0182566 A1 | 7/2011 | Watanabe | |
| 2015/0002702 A1 | 1/2015 | Hu et al. | |
| 2019/0165697 A1 | 5/2019 | Ninomiya et al. | |
| 2019/0212520 A1 | 7/2019 | Lin | |
| 2020/0174270 A1 | 6/2020 | Enta et al. | |

FOREIGN PATENT DOCUMENTS

| | | |
|---|---|---|
| JP | 02-111982 | 4/1990 |
| JP | 04-147107 | 5/1992 |
| JP | 11-231198 | 8/1999 |
| JP | 11-265212 | 9/1999 |
| JP | 2000-014176 | 1/2000 |
| JP | 2002-189165 | 7/2002 |
| JP | 2005-057839 | 3/2005 |
| JP | 2010-066713 | 3/2010 |
| JP | 2015-503775 | 2/2015 |
| JP | 2017-051041 | 3/2017 |
| JP | 2018-036416 | 3/2018 |
| JP | 2018-205683 | 12/2018 |
| JP | 2019-097346 | 6/2019 |

\* cited by examiner

LENS DRIVE DEVICE, CAMERA MODULE, AND CAMERA MOUNT DEVICE

TECHNICAL FIELD

The present invention relates to a lens driving device, a camera module, and a camera-mounted device.

BACKGROUND ART

Camera modules mounted on thin camera-mounted devices such as smartphones are known. Some of such camera modules are known to have a lens driving device having a zoom function for enlarging or reducing a subject image.

For example, Patent Literature (hereinafter, referred to as PTL) 1 discloses a configuration having a fixed lens on which light from a subject is incident, two movable lenses on which light bent by the fixed lens is incident, and a lens driving part configured to move the two movable lenses in the direction of the optical axis.

This lens driving part includes feed screw mechanisms with motors corresponding to the two movable lenses, respectively. In the housing of the camera module, the motors are respectively provided at both ends in the direction of the optical axis, in the region adjacent to the fixed lens and the movable lenses. The drive shaft of each motor is provided with an engagement nut that engages with the frame of the movable lens and can be moved on the drive shaft by rotating the drive shaft. The movable lens is moved when the engaging nut is moved on the drive shaft by the rotational drive of the motor.

CITATION LIST

Patent Literature

PTL 1

Japanese Patent Application Laid-Open No. 2018-36416

SUMMARY OF INVENTION

Technical Problem

From the viewpoint of improving the performance of the zoom function of the lens driving device, it is preferable to increase the moving range of each movable lens. A motor such as a stepping motor has a size of a certain level, thus providing two motors as in PTL 1 may cause the outer shape of the lens driving device to become too large when the amount of movement of the movable lens is taken into account.

An object of the present invention is to provide a lens driving device, camera module, and camera-mounted device that can be downsized while the moving range of the movable lens is not compromised.

Solution to Problem

A lens driving device according to the present invention includes the following:
a first movable part and a second movable part arranged in a direction of an optical axis, wherein the first movable part is capable of holding a first movable lens, and the second movable part is capable of holding a second movable lens; and
a first driving part and a second driving part that respectively drive the first movable part and the second movable part in the direction of the optical axis,
in which
the first driving part and the second driving part respectively include a first ultrasonic motor and a second ultrasonic motor, the first ultrasonic motor and the second ultrasonic motor are disposed so as to be opposite to each other with respect to the optical axis, the first ultrasonic motor independently drives the first movable part in the direction of the optical axis, and the second ultrasonic motor independently drives the second movable part in the direction of the optical axis.

A camera module according to the present invention includes the following:
the above-described lens driving device;
a lens part that includes the first movable lens held by the first movable part and the second movable lens held by the second movable part; and
an image capturing part that captures a subject image formed by the lens part,
in which
the camera module drives the first movable lens and the second movable lens in the direction of the optical axis.

A camera-mounted device according to the present invention is an information device or a transporting device, and the camera-mounted device includes the following:
the above-described camera module; and
an image capturing control part that processes image information obtained by the camera module.

Advantageous Effects of Invention

The present invention achieves downsizing while the moving range of a movable lens is not compromised.

DESCRIPTION OF EMBODIMENTS

Figure 1:
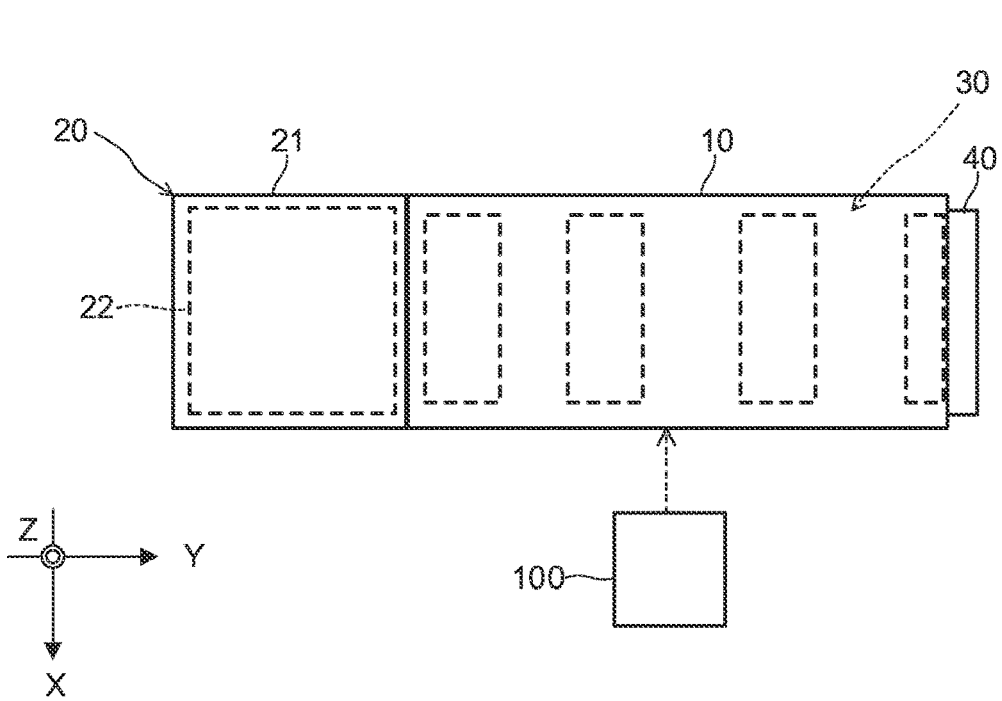
FIG. 1 schematically illustrates a camera module according to an embodiment of the present invention.
Figure 2:
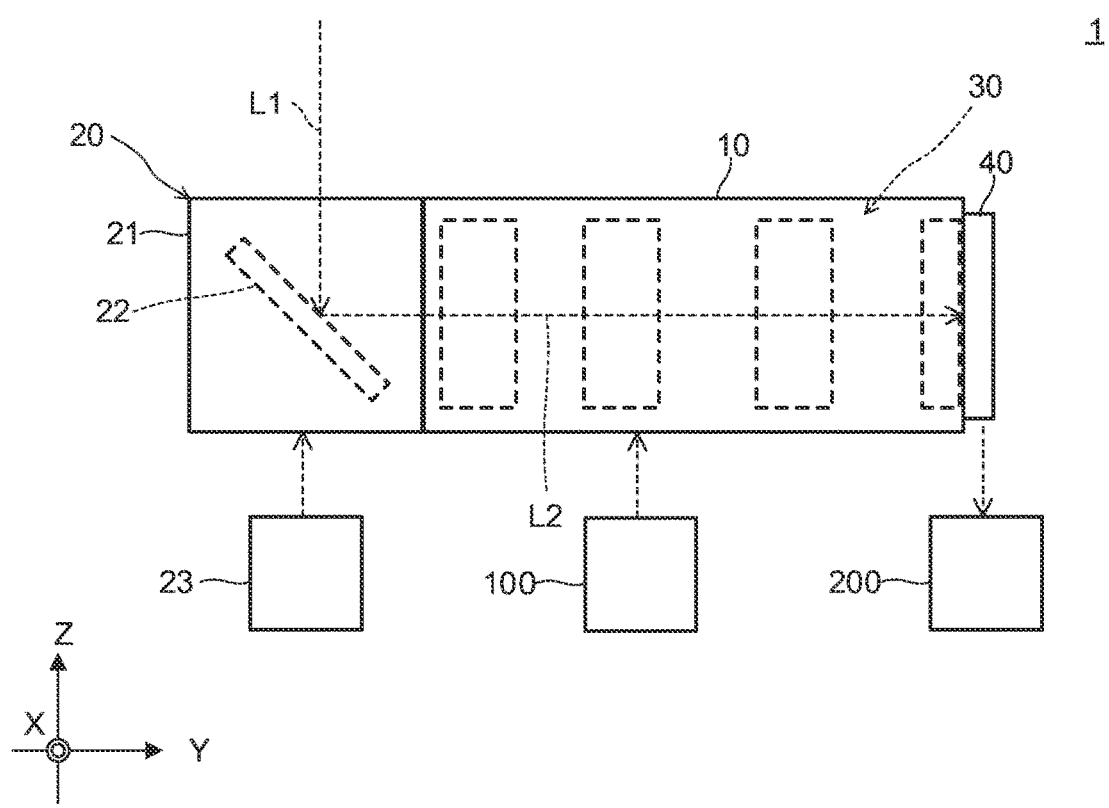
FIG. 2 schematically illustrates the camera module according to the present embodiment viewed from the side.

Hereinafter, at least one embodiment of the present invention will be described in detail with reference to the accompanying drawings. FIG. 1 schematically illustrates camera module 1 according to an embodiment of the present invention. FIG. 2 schematically illustrates camera module 1 according to the present embodiment viewed from the side.

Figure 18A:
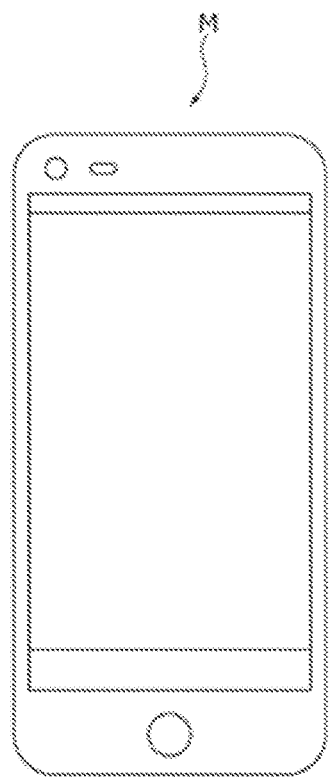
FIG. 18A illustrates a smartphone equipped with the camera module.
Figure 18B:
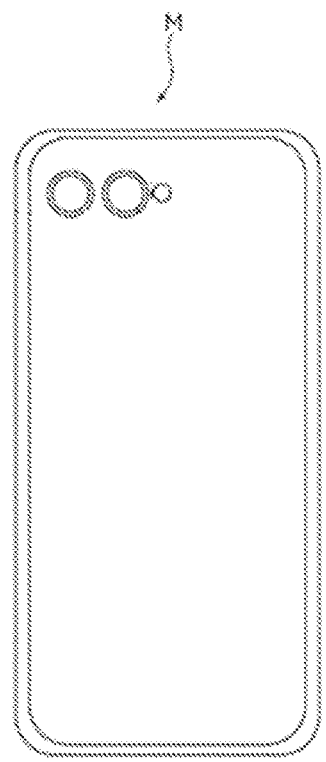
FIG. 18B illustrates the smartphone equipped with the camera module.

Camera module 1 is mounted on a thin camera-mounted device, for example, smartphone M (see FIGS. 18A and 18B), a mobile phone, a digital camera, a notebook computer, a tablet terminal, a portable game machine, or an in-vehicle camera.

An orthogonal coordinate system (X, Y, Z) is used in the description of the structure of camera module 1 of the present embodiment. The drawings to be described below are also illustrated with the common orthogonal coordinate system (X, Y, Z). Camera module 1 is mounted in the camera-mounted device in such a way that, for example, the X direction is a horizontal direction, the Y direction is a vertical direction, and the Z direction is a front-rear direction when the imaging is actually performed with the use of the camera-mounted device. The light from the subject is incident from the − side (minus side) in the Z direction, is bent, and is guided to the + side (plus side) in the Y direction. Reducing the thickness of camera module 1 in the Z direction can reduce the thickness of the camera-mounted device.

As illustrated in FIG. 1, camera module 1 includes housing 10, reflection driving part 20, lens part 30, image capturing part 40, guide shafts 50 (see FIG. 3), lens driving parts 60 (see FIG. 5), position detection parts 70 (see FIG. 9), and driving control part 100.

Driving control part 100 includes a central processing unit (CPU), a read only memory (ROM), a random access memory (RAM), and the like. The CPU reads a program according to the processing content from the ROM, loads the program in the RAM, and centrally controls lens driving part 60 in cooperation with the loaded program. Accordingly, driving control part 100 drives second lens unit 32 and third lens unit 33 (described below) of lens part 30 housed in housing 10 in the Y direction (direction of the optical axis). As a result, camera module 1 performs stepless optical zoom and autofocus. Housing 10, guide shafts 50, lens driving parts 60, position detection parts 70, and driving control part 100 correspond to the "lens driving device" of the present invention.

As illustrated in FIG. 2, incident light L1 enters housing 10 via reflection driving part 20 in camera module 1. Reflection driving part 20 includes reflection housing 21, mirror 22, and reflection driving control part 23. In the example illustrated in FIGS. 1 and 2, reflection housing 21 is disposed adjacent to the end of housing 10 on the − side in the Y direction. Mirror 22 is provided in reflection housing 21, and reflects incident light L1 toward housing 10 as reflected light L2. Reflection driving control part 23 includes a CPU, ROM, RAM, and the like, and controls the orientation of mirror 22.

Mirror 22 according to the present embodiment includes two rotating shafts (not illustrated) extending in the X and Z directions. In reflection driving part 20, mirror 22 rotates about the rotation axes under the control of reflection driving control part 23. This configuration allows camera module 1 to have a shake correction function (optical image stabilization: OIS) function) that optically corrects shake (vibration) generated during the imaging to reduce image distortion.

Reflected light L2 having entered housing 10 is output to image capturing part 40 via lens part 30 housed in housing 10.

Image capturing part 40 is disposed on the outer surface (disposition part 112B of second wall 112 described below) of housing 10, the outer surface is on the + side in the Y direction. Image capturing part 40 is configured in such a way that reflected light L2 is incident thereon via lens part 30. Image capturing part 40 includes an image capturing device, a board (not illustrated), and the like.

The image capturing device is composed of, for example, a charge coupled device (CCD) image sensor, a complementary metal oxide semiconductor (CMOS) image sensor, or the like. The image capturing device is mounted on the board and is electrically connected to the wiring on the board via a bonding wire. The image capturing device captures the subject image formed by lens part 30 and outputs electric signals corresponding to the subject image.

A printed wiring board (not illustrated) is electrically connected to the board of image capturing part 40, and via the printed wiring board, power is supplied to the image capturing device and the electric signals of the subject image captured by the image capturing device are output. The electric signals are output to image capturing control part 200 provided in the camera-mounted device. Image capturing control part 200 includes a CPU, ROM, RAM, and the like, and processes the image information obtained by camera module 1. Image capturing control part 200 is mounted on the camera-mounted device, and may be built into camera module 1.

Figure 3:
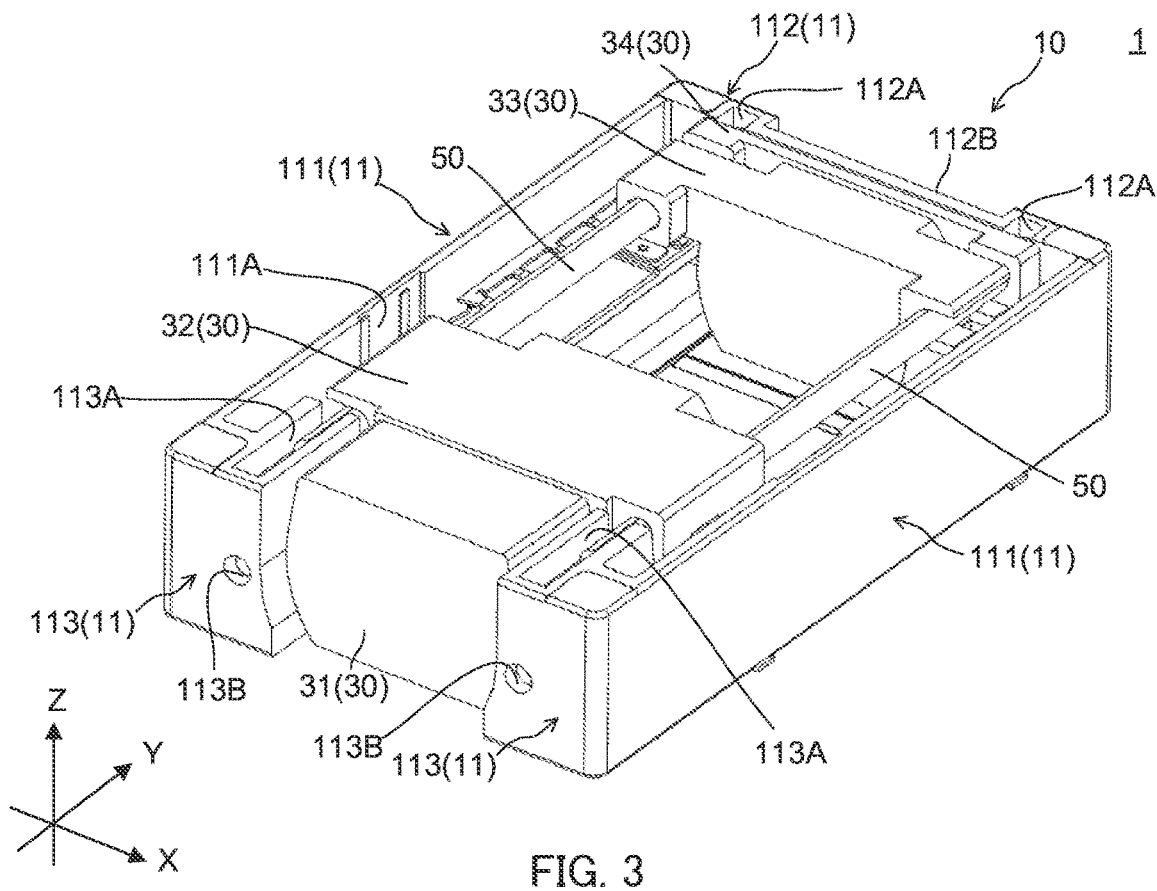
FIG. 3 is a perspective view illustrating a housing portion of the camera module.

As illustrated in FIG. 3, housing 10 houses lens part 30, guide shafts 50, and lens driving parts 60 (see also FIG. 5), and has, for example, a rectangular parallelepiped shape as a whole. Housing 10 includes side wall part 11 and bottom wall part 12.

Side wall part 11 is made of, for example, resin, and is configured, for example, in a U shape which is open on the −side in the Y direction. Side wall part 11 includes first walls 111, second wall 112, third walls 113, and fourth walls 114 (see also, for example, FIG. 8).

Figure 4:
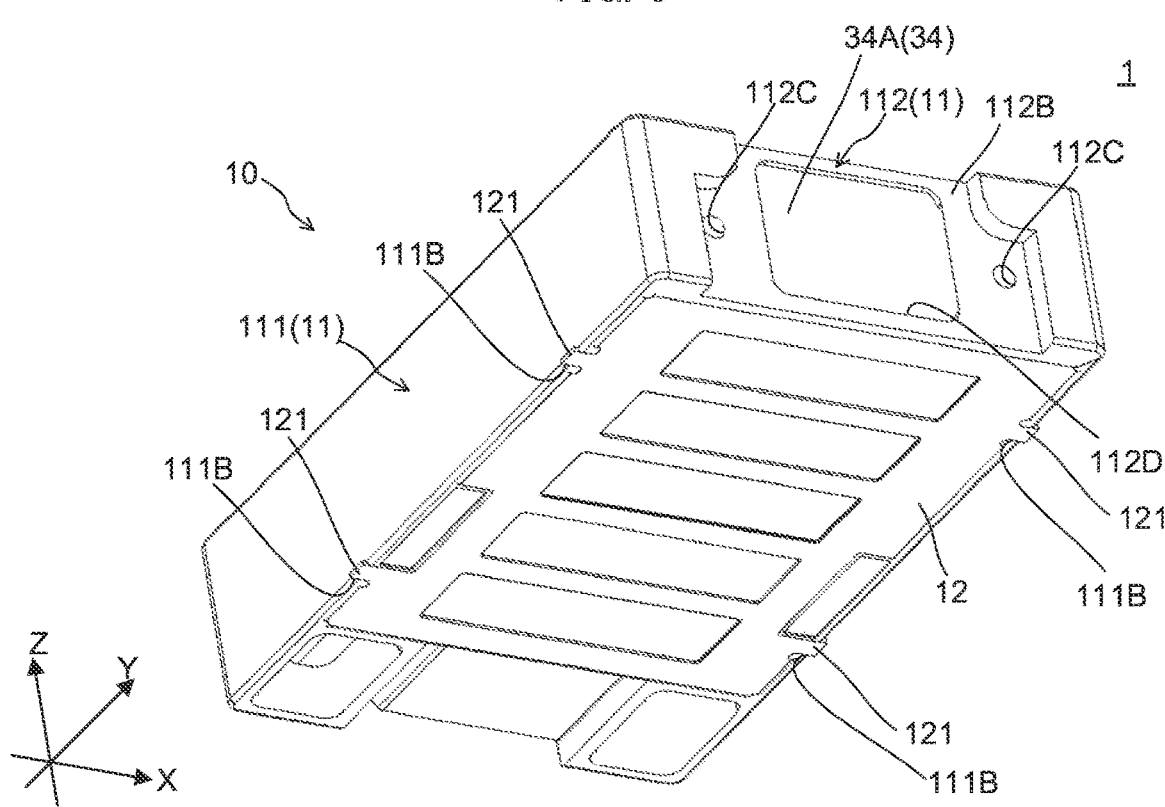
FIG. 4 is a perspective view illustrating the housing portion of the camera module from the bottom wall part side.

A pair of first walls 111 each extending in the Y direction are provided on both sides of the side wall part in the X direction, respectively. On the inner surface of first wall 111 in housing 10, provided is disposition part 111A on which a piezoelectric element described below is to be provided. In addition, as illustrated in FIG. 4, engaged parts 111B for engaging with positioning parts 121 of bottom wall part 12 are formed on the bottom surface (the surface on the − side in the Z direction) of first wall 111. The pair of first walls 111 correspond to the "pair of wall parts" of the present invention.

As illustrated in FIGS. 3 and 4, second wall 112 extends in the X direction, and is provided so as to connect the respective ends (both on the + side in the Y direction) of the pair of first walls 111. In addition, guide support parts 112A for supporting guide shafts 50 are respectively provided on both sides, in the X direction, of the top surface part (the surface on the + side in the Z direction) of second wall 112. The outer surface of second wall 112 is provided with disposition part 112B where image capturing part 40 is to be disposed.

Drive support parts 112C and opening part 112D are provided in disposition part 112B of second wall 112. In the present embodiment, drive support parts 112C are holes for supporting drive shafts 61 described below, and are provided on both sides, in the X direction, of disposition part 112B. Opening part 112D is an opening into which fourth lens unit 34 of lens part 30 is to be fit. Opening part 112D is provided at the central part in the X direction in disposition part 112B.

As illustrated in FIG. 3, third walls 113 are respectively provided at the ends (both on the − side in the Y direction) of the pair of first walls 111. The pair of third walls 113 are provided in such a way that the space formed by first walls 111 and second wall 112 is surrounded. A gap sufficiently large for first lens unit 31 of lens part 30 to enter the gap is formed between third walls 113.

In addition, guide support parts 113A for supporting guide shafts 50 are respectively provided on the top surfaces (the surfaces on the + side in the Z direction) of the pair of third walls 113. Drive support parts 113B for supporting drive shafts 61 described below are provided near the central parts, in the Z direction, of the pair of third walls 113, respectively.

In the present embodiment, the height of drive support part 113B is the same as the height of drive support part 112C of second wall 112 described above.

Figure 5:
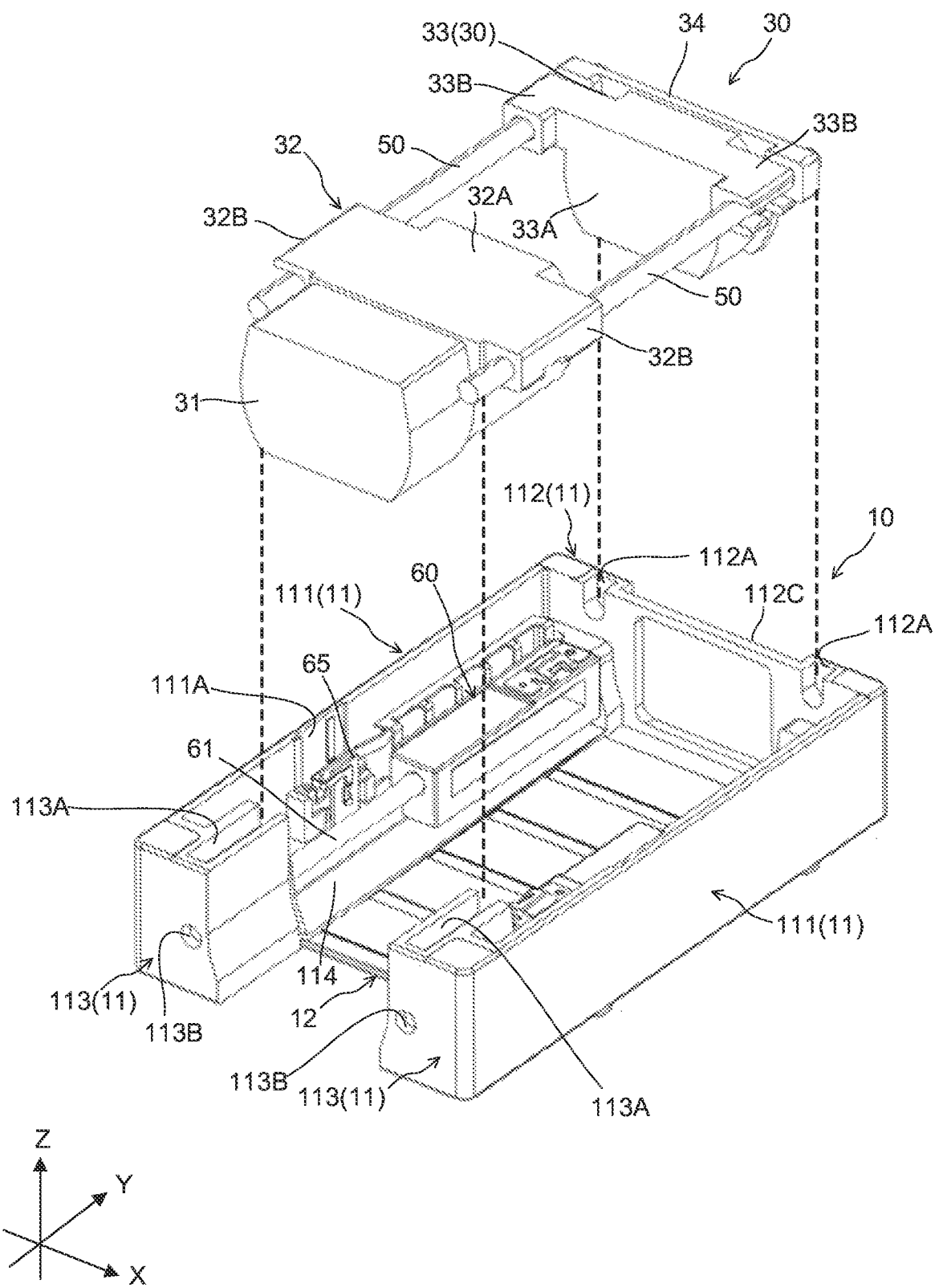
FIG. 5 is an exploded perspective view of a housing and a lens part.

As illustrated in FIG. 5, fourth wall 114 constitutes the bottom wall of the space formed by each first wall 111, third wall 113 corresponding to the first wall 111, and the second wall 112. The fourth wall 114 is provided in the region corresponding to third wall 113 in the X direction (see also FIG. 8). Therefore, a gap is formed between fourth walls 114 on both sides in the X direction.

The following correspond to the "wall parts at both ends in the direction of the optical axis" of the present invention: a wall part in side wall part 11 at a region of fourth wall 114 on the + side in the X direction and a wall part in side wall part 11 at a region of fourth wall 114 on the − side in the X direction.

Figure 6:
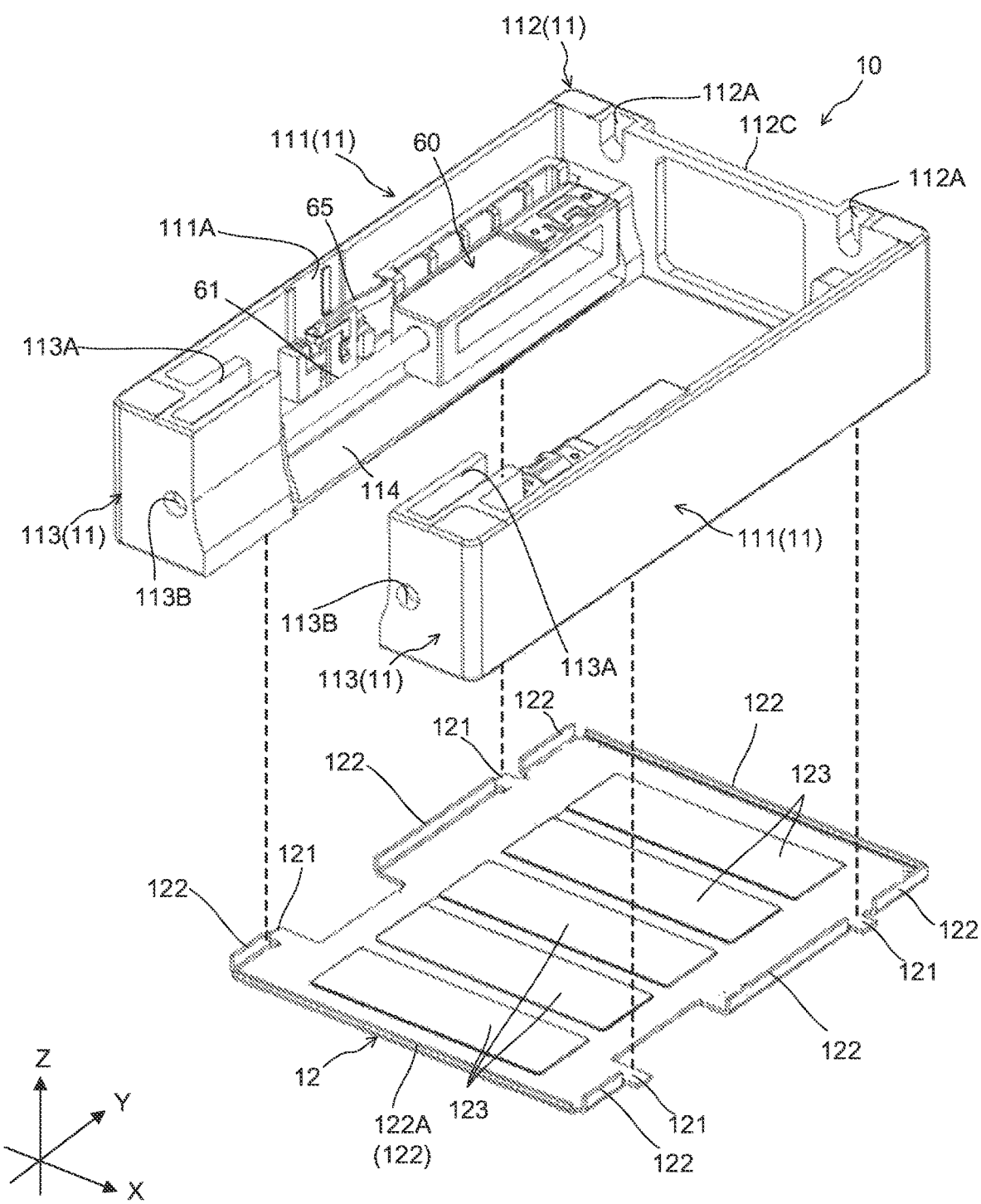
FIG. 6 is an exploded perspective view of a side wall part and a bottom wall part in the housing.

As illustrated in FIGS. 4 to 6, bottom wall part 12 is, for example, a substantially rectangular metal plate constituting the bottom wall of housing 10. Bottom wall part 12 is provided so as to bridge fourth walls 114 on both sides in the X direction and bridge the pair of first walls 111 on both sides in the X direction. Bottom wall part 12 is integrated by insert molding with the bottom surface portion of side wall part 11, the bottom surface portion includes the bottom portions of the pair of first walls 111.

Positioning parts 121 are provided at both ends of bottom wall part 12 in the X direction. Positioning parts 121 are provided so as to protrude from the both ends of bottom wall part 12, and configured to engage with engaged parts 111B of first walls 111 described above. This configuration allows positioning of bottom wall part 12 in the Y direction.

Figure 7:
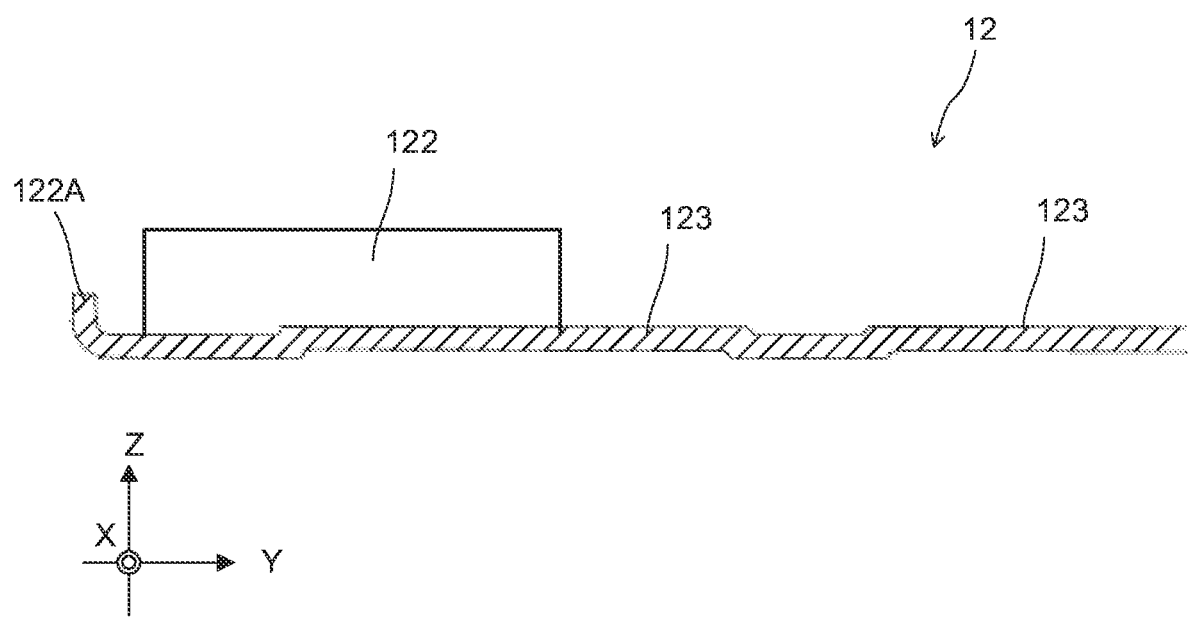
FIG. 7 is a partial cross-sectional view of the bottom wall part.

As illustrated in FIGS. 6 and 7, bent parts 122 are provided at the side ends, in the X direction and the Y direction, of bottom wall part 12. Bent part 122 is formed by bending each side end toward the + side in the Z direction. Bent parts 122 at both side ends in the Y direction are shorter than bent parts 122 at both side ends in the X direction.

In addition, grooves (not illustrated) each allowing bent part 122 to enter the groove are formed in housing 10 at portions corresponding to bent parts 122. Inserting bent parts 122 into these grooves fixes bottom wall part 12 to housing 10.

Further, side wall part 11 is formed, for example, in a substantially U shape. Bent part 122A at the end on the − side in the Y direction (direction of the optical axis) in bottom wall part 12 is thus located in a portion where there is no wall. In other words, the end—located on the light incident side in the Y direction—of bottom wall part 12 is bent toward side wall part 11. Providing bent part 122 in this way can improve the strength of the bottom wall part of housing 10.

Plurality of half punches 123 arranged in the Y direction are formed on the surface of bottom wall part 12. Half punch 123 is provided to extend in the X direction on bottom wall part 12. In the present embodiment, a total of five half punches 123 are provided.

Providing half punches 123 in this way can improve the strength of the bottom wall part of housing 10.

As illustrated in FIGS. 3 and 5, lens part 30 is provided in a region that is located between first walls 111. The region includes a region through which reflected light L2 (see FIG. 2) from reflection driving part 20 passes. Lens part 30 includes first lens unit 31, second lens unit 32, third lens unit 33, and fourth lens unit 34 arranged in the Y direction.

First lens unit 31 is disposed on the most upstream side in the incident direction (direction toward the + side in the Y direction) of reflected light L2, and is fixed between third walls 113 in housing 10.

The side surface of first lens unit 31 is, for example, configured to be curved so that the central portion thereof in the Z direction protrudes. The side surface of third wall 113 on the first lens unit 31 side has a shape such that, for example, the side surface follows the side surface of first lens unit 31. The side surfaces of third walls 113 are configured to fit the curved portions of first lens unit 31. This configuration allows first lens unit 31 to be fixed between third walls 113.

Second lens unit 32 is disposed downstream of first lens unit 31 in the incident direction, and includes main body part 32A and supported parts 32B. Third lens unit 33 is disposed downstream of second lens unit 32 in the incident direction, and includes main body part 33A and supported parts 33B. Second lens unit 32 corresponds to the "first movable part" of the present invention, and third lens unit 33 corresponds to the "second movable part" of the present invention.

Each of main body parts 32A and 33A is for holding a lens through which light having passed through first lens unit 31 passes. Supported parts 32B are movably supported by guide shafts 50, and are provided on both sides of main body part 32A in the X direction, respectively. Supported parts 33B are movably supported by guide shafts 50, and are provided on both sides of main body part 33A in the X direction, respectively.

The lens included in main body part 32A of second lens unit 32 corresponds to the "first movable lens" of the present invention. The lens included in main body part 33A of third lens unit 33 corresponds to the "second movable lens" of the present invention.

Fourth lens unit 34 is disposed on the most downstream side in the incident direction, and includes a lens. Fourth lens unit 34 is supported by guide shafts 50 at a position adjacent to second wall 112 of housing 10. In the present embodiment, convex part 34A is provided on the surface, on the + side in the Y direction, of fourth lens unit 34 as illustrated in FIG. 4.

The lenses in first to fourth lens units 31 to 34 may be assembled with housing 10 at the time of manufacturing a lens driving device, or may be assembled with housing 10 when camera module 1 is manufactured from the lens driving device.

Convex part 34A has a size such that the convex part can be fitted into opening part 112D of second wall 112. Fourth lens unit 34 is fixed to housing 10 by fitting convex part 34A into opening part 112D.

As illustrated in FIGS. 3 and 5, guide shaft 50 is made of, for example, stainless steel. Guide shafts 50 extend in the Y direction and are respectively provided in the regions of the pair of third walls 113. Guide shafts 50 have the same length as each other in the present embodiment, and each guide shaft is supported by guide support part 113A of third wall 113 and guide support part 112A of second wall 112.

Figure 8:
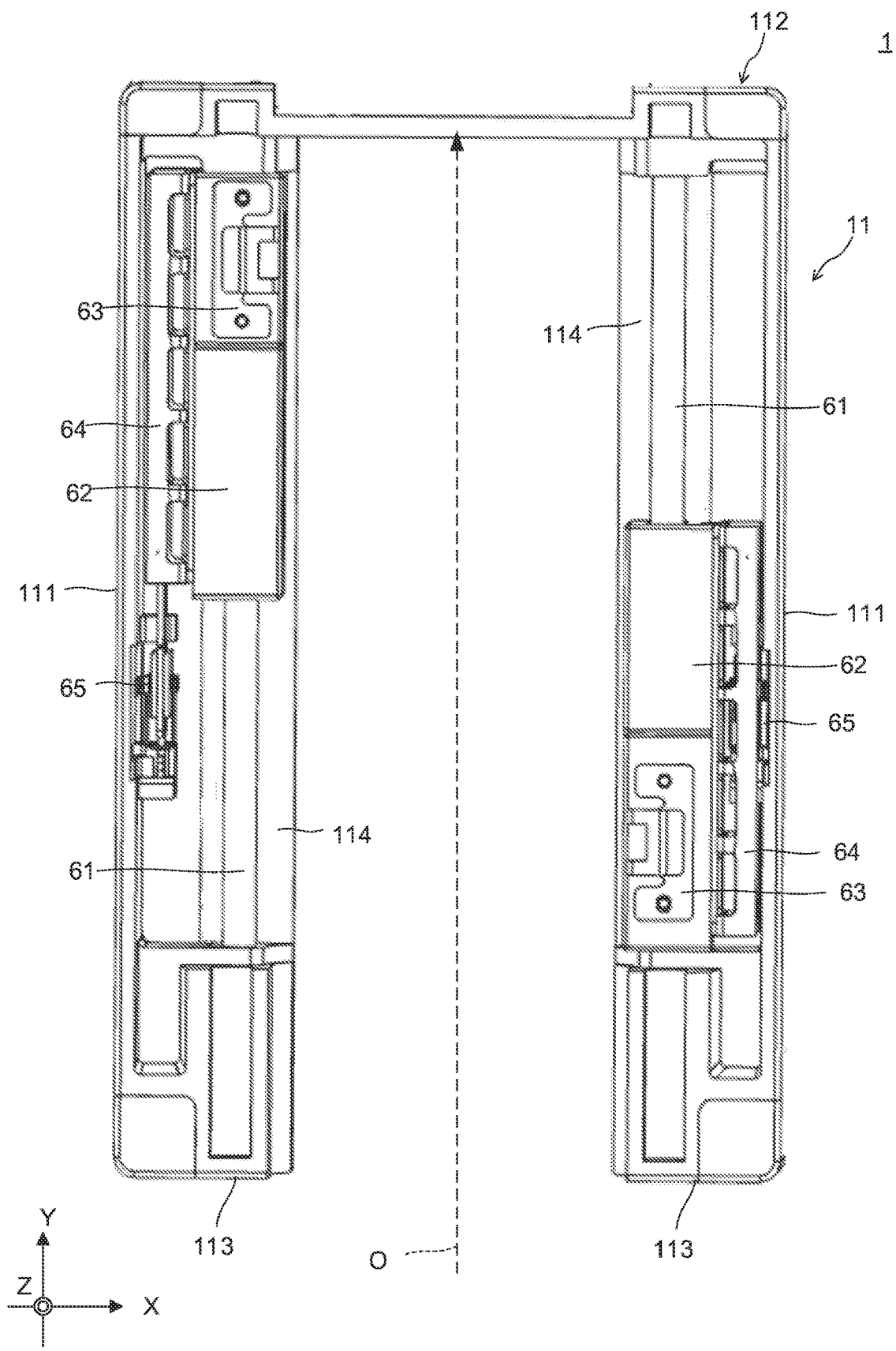
FIG. 8 illustrates the housing as viewed from the + side in the Z direction.

As illustrated in FIG. 8, the pair of first walls 111 have, for example, substantially the same shape, and are disposed symmetrically on both sides in the X direction with respect to optical axis O in lens part 30. The same configuration and positional relationship apply to third walls 113 and to fourth walls 114. Specifically, the pairs of first walls 111, third walls 113, and fourth walls 114 are individually disposed symmetrically with respect to optical axis O so that each first wall 111 is disposed at a predetermined distance from optical axis O.

Disposing the pairs of first wall 111, third walls 113, and fourth walls 114 in this way allows guide shafts 50, which are respectively supported by third walls 113, to be disposed symmetrically with respect to optical axis O. More specifically, the pair of guide shafts 50 respectively extend on both sides of optical axis O and are disposed in such a way that the distances from optical axis O to the respective guide shafts 50 are equal to each other.

The pair of guide shafts 50 corresponds to the "guide part" of the present invention. Guide shaft 50 on the + side in the X direction corresponds to the "first guide shaft" of the present invention, and guide shaft 50 on the − side in the X direction corresponds to the "second guide shaft" of the present invention.

Lens driving parts 60 are provided in such a way that one of the lens driving part corresponds to second lens unit 32 and the other one of the lens driving part corresponds to third lens unit 33. Lens driving parts 60 independently move corresponding second lens unit 32 and third lens unit 33 under the control of driving control part 100 described above. Lens driving parts 60 are disposed in the regions of fourth walls 114 on both sides in the X direction. Each of the regions of fourth walls 114 is surrounded by first wall 111, second wall 112, and third wall 113. That is, one driving part 60 is provided on each side of the optical axis in housing 10.

In the present embodiment, lens driving part 60 on the + side in the X direction drives second lens unit 32 in the Y direction, and lens driving part 60 on the − side in the X direction drives third lens unit 33 in the Y direction In other words, lens driving part 60 on the + side in the X direction corresponds to the "first driving part" of the present invention, and lens driving part 60 on the − side in the X direction corresponds to the "second driving part" of the present invention.

Lens driving parts 60 have the same shape in the present embodiment; therefore, unless otherwise specified, only lens driving part 60 corresponding to second lens unit 32 will be described, and the description of lens driving part 60 corresponding to third lens unit 33 will be omitted in the following description. Lens driving parts 60 are symmetrically disposed on both sides in the X direction and in the Y direction in the present embodiment. Therefore, the relationship between the + side and the − side of the direction in lens driving part 60 corresponding to second lens unit 32 is reversed in lens driving part 60 corresponding to third lens unit 33.

Lens driving part 60 includes drive shaft 61, frame 62, connection part 63, interposition part 64, and ultrasonic motor 65.

Drive shaft 61 is a non-magnetic or low-magnetic ceramic (for example, zirconia) shaft for moving frame 62 in the Y direction, and extends in the Y direction. Drive shaft 61 is supported by drive support part 112C of second wall 112 and drive support part 113B of third wall 113. Drive shaft 61 is disposed on the − side in the Z direction relative to guide shaft 50. Drive shafts 61 are provided on third walls 113 on both sides in the X direction, thus the distances from optical axis O to two respective drive shafts 61 are equal to each other.

In addition, two drive shafts 61 each have a length substantially equal to the length from second wall 112 to third wall 113, and are longer than guide shaft 50. Drive shaft 61 is thinner than guide shaft 50.

Drive shaft 61 on the + side in the X direction corresponds to the "first drive shaft" of the present invention, and drive shaft 61 on the − side in the X direction corresponds to the "second drive shaft" of the present invention.

Frame 62 is connected to either one of supported part 32B of second lens unit 32 and supported part 33B of third lens unit 33 via connection part 63.

Frame 62 on the +side in the X direction corresponds to the "first frame" of the present invention, and frame 62 on the − side in the X direction corresponds to the "second frame" of the present invention.

Frame 62 is supported by drive shaft 61 so as to be movable in the Y direction. Frame 62 moving along drive shaft 61 moves second lens unit 32 or third lens unit 33, which is connected to frame 62 via connection part 63, along guide shaft 50.

In the present embodiment, frame 62 has a length longer than its own movable distance. Specifically, the length of frame 62 in the Y direction is longer than the movable distance of frame 62 in housing 10.

Figure 9:
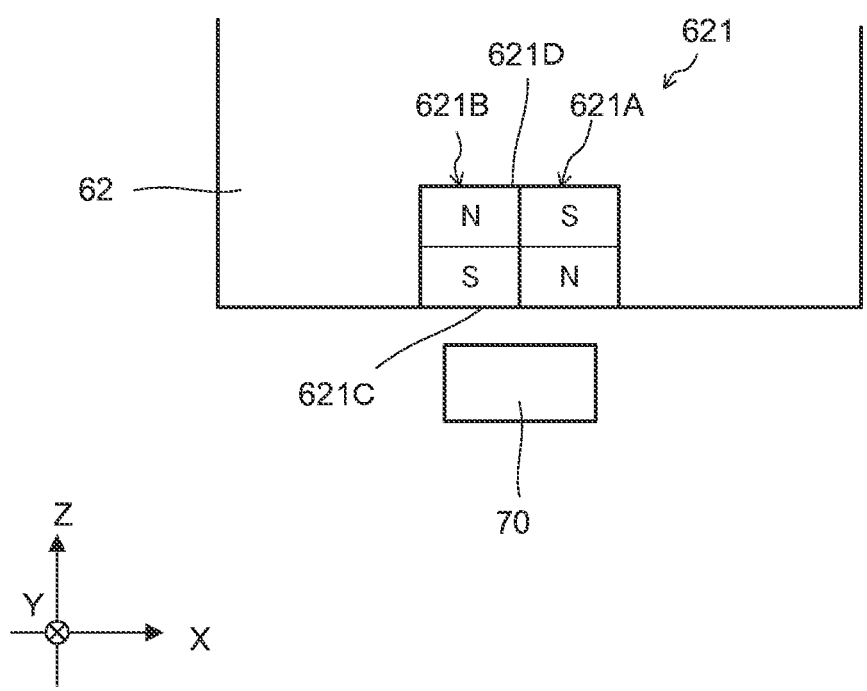
FIG. 9 illustrates a facing portion between magnets and a position detection part.

As illustrated in FIG. 9, magnet part 621 for detecting the position of frame 62 is provided in frame 62 at the portion on the − side in the Z direction. Magnet part 621 includes two magnets 621A and 621B arranged in the X direction. Magnet part 621 is disposed in frame 62, for example, in a recess formed in the surface on the − side in the Z direction.

In addition, position detection part 70 is provided in housing 10 at a portion facing magnet part 621. Position detection part 70 is, for example, a Hall element that detects the position of frame 62 in the Y direction. Position detection part 70 detects the position of magnet part 621 based on a predetermined reference position. The predetermined reference position is a position common to two magnets 621A and 621B, and is set, for example, in bottom wall part 12 at an appropriate position such as the end on the + side or − side in the Y direction.

In magnet part 621, magnet 621A, one of the magnets, is disposed so that the N pole faces position detection part 70, and magnet 621B, the other one of the magnets, is disposed so that the S pole faces position detection part 70. That is, two magnets 621A and 621B are magnetized along the direction in which magnet part 621 faces position detection part 70 (Z direction in the present embodiment), and magnetized in such a way that different poles face position detection part 70.

Magnets 621A and 621B are disposed in contact with each other. Therefore, different poles are disposed adjacent to each other on facing surface 621C, which faces position detection part 70, in magnet part 621.

Figure 10A:
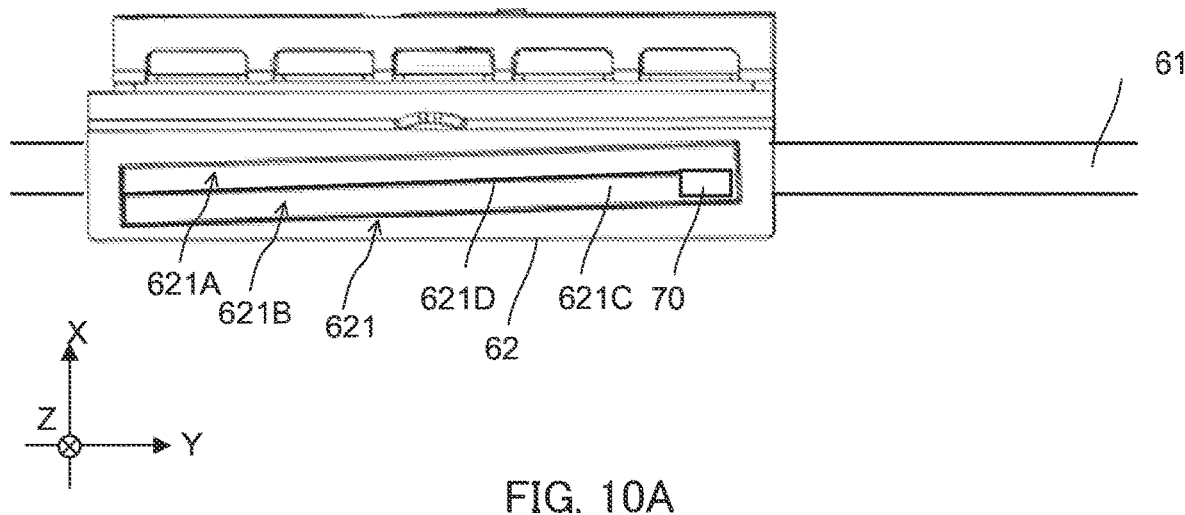
FIG. 10A is a diagram for explaining a positional relationship between the magnets and the position detection part.
Figure 10B:
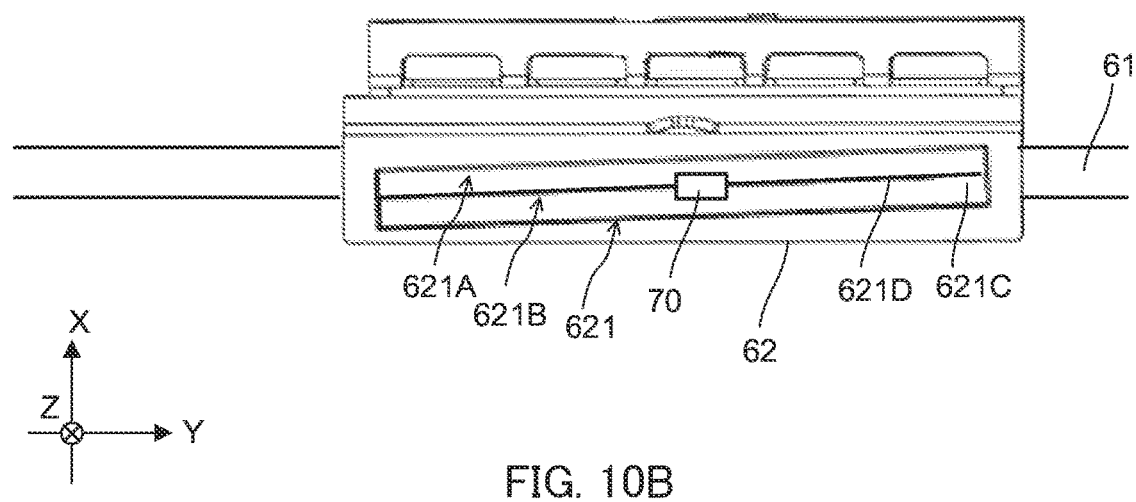
FIG. 10B is a diagram for explaining the positional relationship between the magnets and the position detection part.
Figure 10C:
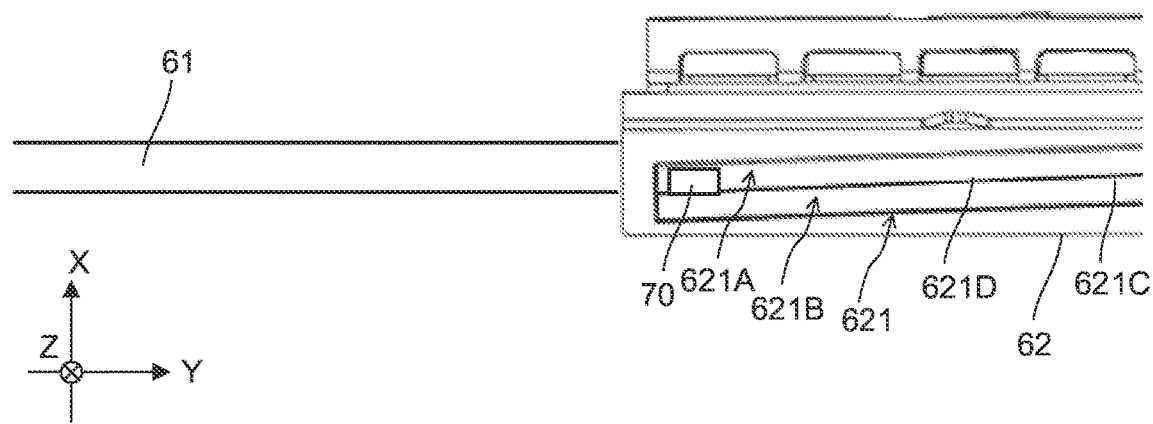
FIG. 10C is a diagram for explaining the positional relationship between the magnets and the position detection part.

As illustrated in FIGS. 10A, 10B, and 10C, magnet part 621 is disposed so as to be inclined with respect to the Y direction. That is, boundary 621D between different poles in magnet part 621 extends so as to be inclined with respect to the optical axis.

This configuration allows position detection part 70 to change the proportion of the N pole and the proportion of the S pole in the portion that faces magnet 621 according to the movement of frame 62 in the Z direction.

As illustrated in FIG. 10A, for example, when frame 62 is located at the most −side position in the Y direction, position detection part 70 faces end of magnet 621 on the +side in the Y direction. Position detection part 70 faces a portion having a large proportion of magnet 621B, which is the S pole, at this end.

As frame 62 moves toward the +side in the Y direction, magnet 621 also moves with frame 62, thus the facing portion, which faces position detection part 70, in magnet 621 changes. Since magnet 621 is inclined, the proportion of N poles in the facing portion, which faces position detection part 70, gradually increases.

As illustrated in FIG. 10B, when frame 62 moves to a position where position detection part 70 faces the central portion of frame 62, position detection part 70 faces a portion where the proportion of the S pole (magnet 621B) is substantially equal to the proportion of the N pole (magnet 621A).

As illustrated in FIG. 10C, when frame 62 moves to a position where position detection part 70 faces the end of frame 62 on the − side in the Y direction, position detection part 70 faces a portion where the proportion of the N pole (magnet 621A) is large.

This configuration can change the strength of the magnetic force detected by position detection part 70 for different positions of frame 62, thus position detection part 70 can accurately detect the position of frame 62 in the Y direction.

Figure 11:
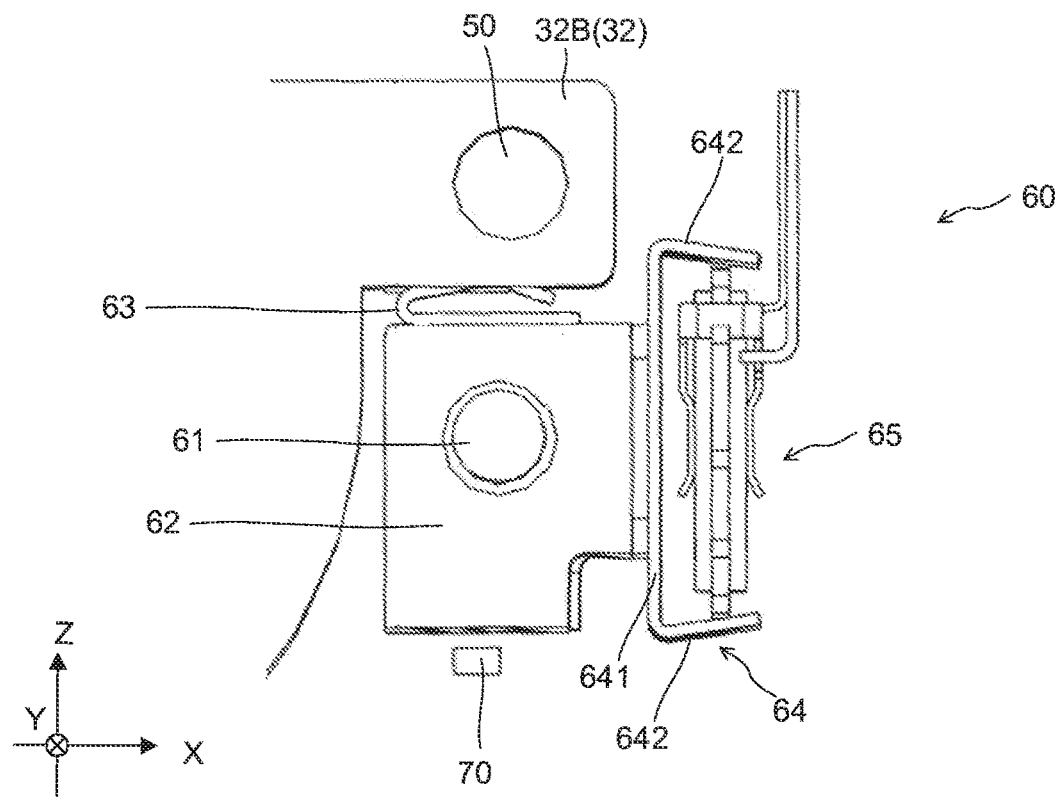
FIG. 11 illustrates a connection portion between the lens part and a frame.

As illustrated in FIG. 11, connection part 63 is a plate-shaped spring member (elastic member) fixed to frame 62 at the surface on the +side in the Z direction and to either one of supported parts 32B and 33B of second lens unit 32 and third lens unit 33 at the surface on the − side in the Y direction. As connection part 63 is formed from a spring member, the elastic force of the spring member can absorb any displacement of the positional relationship between frame 62 and supported part 32B or 33B, which may be caused by manufacturing tolerances or the like.

Connection part 63 on the + side in the X direction corresponds to the "first elastic member" of the present invention, and connection part 63 on the − side in the X direction corresponds to the "second elastic member" of the present invention.

Interposition part 64 is composed of, for example, a plate-shaped metal member, and is fixed to the surface opposite to the lens part in frame 62. Interposition part 64 includes main body part 641 and contact parts 642. Interpretation part 64 on the + side in the X direction corresponds to the "first interpretation part" of the present invention, and interpretation part 64 on the − side in the X direction corresponds to the "second interpretation part" of the present invention.

Figure 12:
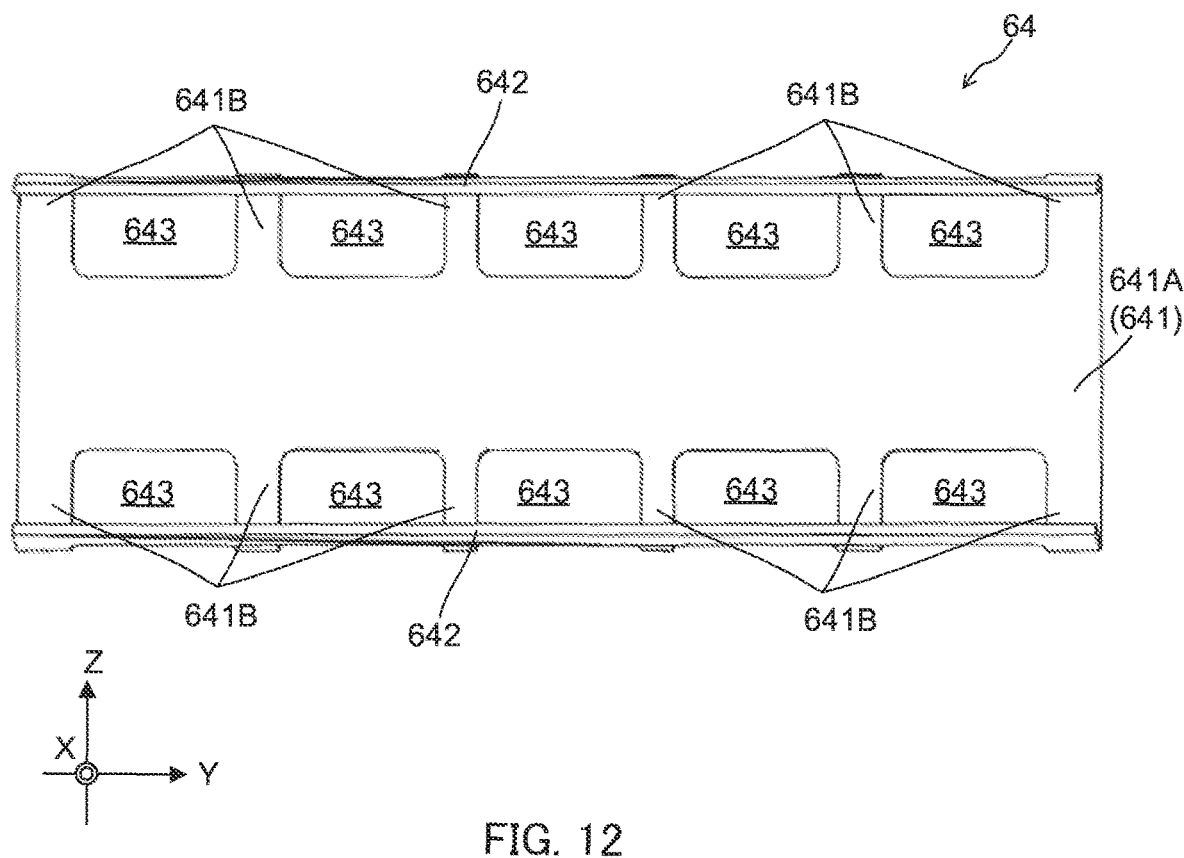
FIG. 12 illustrates a structure of an interposition part.

As illustrated in FIGS. 11 and 12, main body part 641 has a flat surface parallel to the direction of the optical axis (Y direction), and is fixed to frame 62 by bonding. In the present embodiment, the length of main body part 641 in the Y direction is shorter than the length of frame 62 in the Y direction (see also FIG. 8). In other words, the length of frame 62 is longer than the length of main body part 641.

Contact part 642 is a portion where the oscillator of ultrasonic motor 65 comes into contact with. Contact part 642 is formed by bending each end, in the Z direction, of main body part 641 toward the side opposite to the lens part. In other words, main body part 641 is provided between contact parts 642 so as to connect the pair of contact parts 642 to each other.

The configuration of contact part 642 in this way generates thrust in the direction of the optical axis (Y direction) on interposition part 64 due to a force acting on contact parts 642 from the oscillator of ultrasonic motor 65. This thrust can apply thrust for the movement in the direction of the optical axis (Y direction) from interposition part 64 to frame 62.

As illustrated in FIG. 12, plurality of openings 643 are formed in the connection portion between main body part 641 and contact part 642. Five openings 643 are formed in the same size in the connection portion on either side in the Y direction.

With openings 643, the connection portion connects plate-shaped part 641A of main body part 641 with contact part 642, and forms six connection parts 641B arranged at intervals in the direction of the optical axis.

In the present embodiment, the width of connection part 641B in the Y direction (direction of the optical axis) increases from connection part 641B at the center toward connection part 641B on the outer side in the Y direction. That is, the width of connection part 641B at the central part in the Y direction is narrower than the widths of connection parts 641B at both ends in the Y direction.

Figure 13:
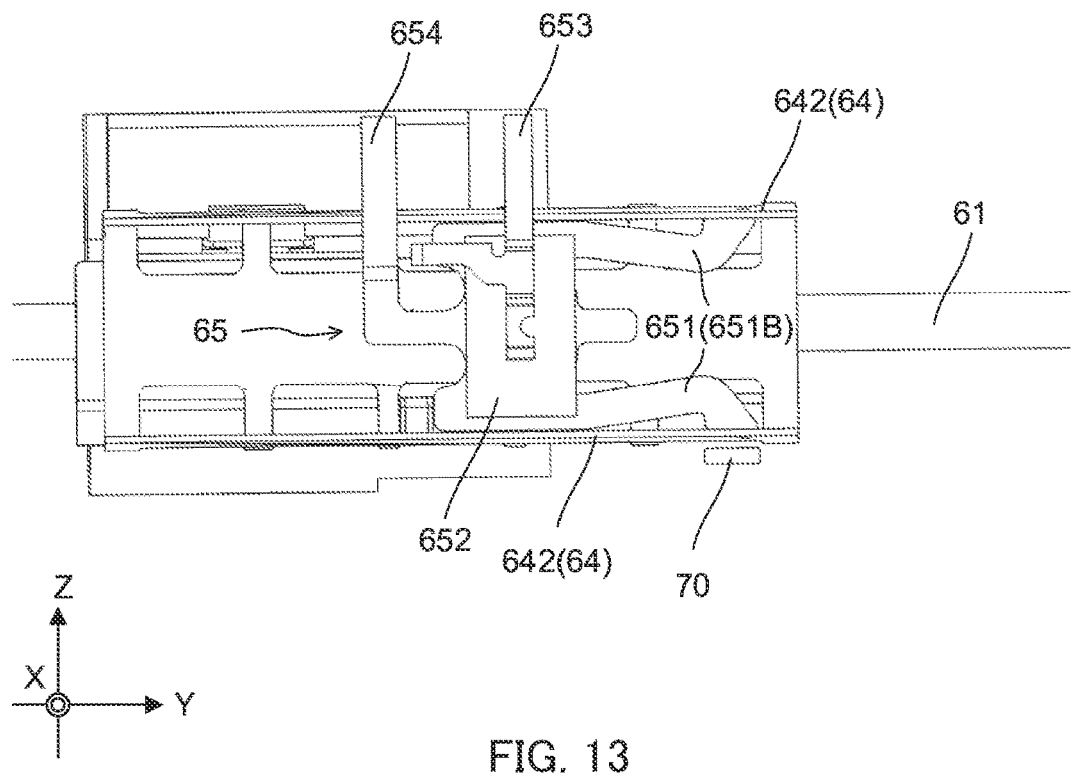
FIG. 13 illustrates an arrangement relationship between the interposition part and an ultrasonic motor.
Figure 14:
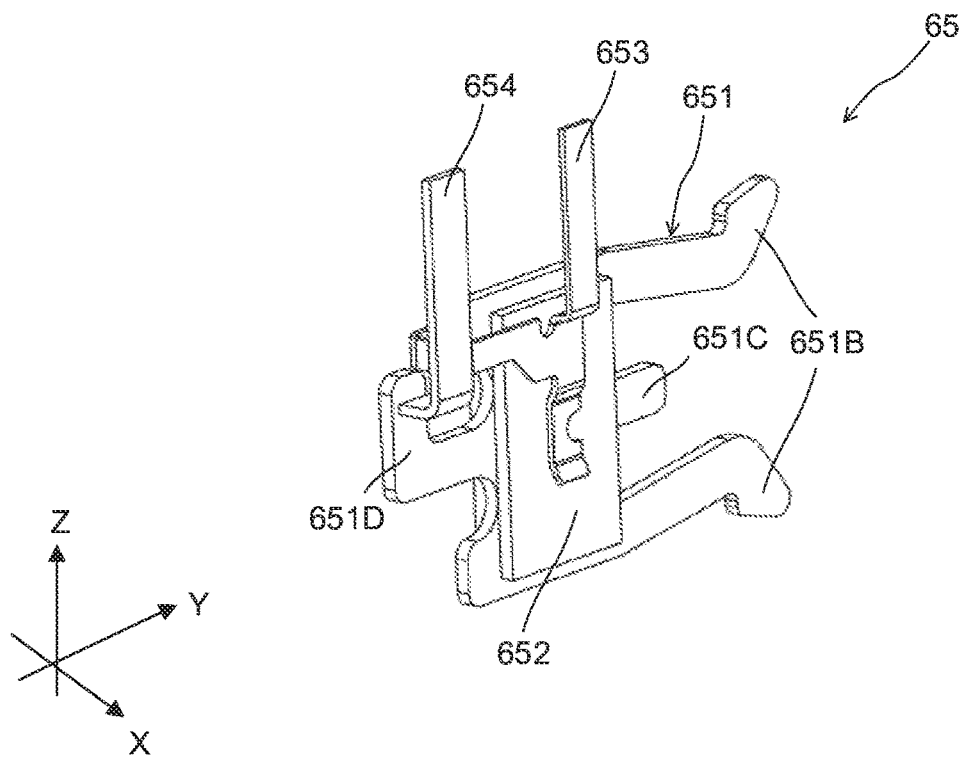
FIG. 14 is a perspective view of the ultrasonic motor.

As illustrated in FIGS. 6 and 13, ultrasonic motors 65 are each a drive source to generate a driving force for moving frame 62, and are respectively disposed and fixed to disposition parts 111A of the pair of first walls 111. As illustrated in FIG. 14, ultrasonic motor 65 includes resonance part 651, piezoelectric elements 652, first electrode 653, and second electrode 654.

Ultrasonic motor 65 on the + side in the X direction corresponds to the "first ultrasonic motor" of the present invention, and ultrasonic motor 65 on the − side in the X direction corresponds to the "second ultrasonic motor" of the present invention.

Figure 15:
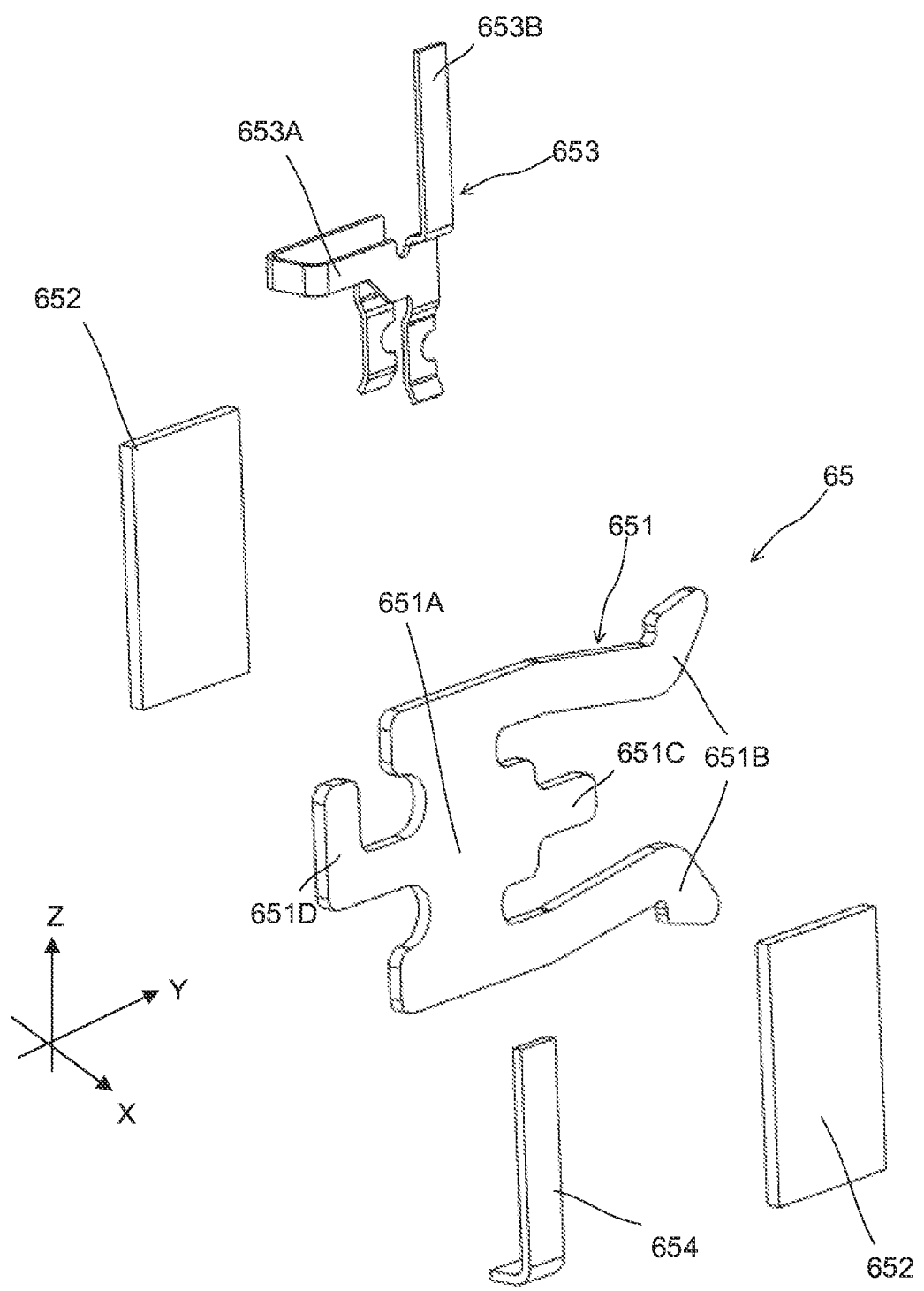
FIG. 15 is an exploded perspective view of the ultrasonic motor.

Resonance part 651 is formed of, for example, a conductive material, resonates with the vibration of piezoelectric element 652, and converts the vibration motion into the linear motion of frame 62. Specifically, resonance part 651 vibrates in an inclined direction that is inclined with respect to the direction of the optical axis (Y direction) based on the vibration of piezoelectric element 652, and presses interposition part 64. Thrust for the movement is thus generated in frame 62 in the direction of the optical axis via interposition part 64. Resonance part 651 is disposed so as to be placed between two contact parts 642 in interposition part 64. As illustrated in FIGS. 14 and 15, resonance part 651 includes body part 651A, two oscillators 651B, protruding part 651C, and energizing part 651D.

Body part 651A is formed, for example, in a substantially rectangular shape and held between piezoelectric elements 652. Two oscillators 651B extend in the Y direction from respective both ends—in the Z direction—of body part 651A. Two oscillators 651B form a symmetrical shape, and the free ends of the oscillators are respectively brought into contact with contact parts 642 of interposition part 64. Two oscillators 651B correspond to the "first oscillator" and the "second oscillator" of the present invention.

Protruding part 651C extends from the central part (in the Z direction) of body part 651A to the +side in the Y direction. Energizing part 651D extends from the central part (in the Z direction) of body part 651A to the side opposite to the protruding part 651C (− side in the Y direction).

Piezoelectric element 652 is, for example, a vibration element formed of, for example, a ceramic material in a plate shape, and generates vibration by applying a high frequency voltage. Two piezoelectric elements 652 are provided, which are disposed so as to hold body part 651A of resonance part 651 therebetween in the X direction.

First electrode 653 includes sandwiching part 653A, which holds resonance part 651 and piezoelectric elements 652, and electrode part 653B to which a voltage is applied. First electrode 653 applies a voltage to piezoelectric element 652 via sandwiching part 653A holding piezoelectric elements 652 and the like. Second electrode 654 is electrically connected to energizing part 651D of resonance part 651. First electrode 653 and second electrode 654 are electrically connected to predetermined wiring of a camera-mounted device.

Two piezoelectric elements 652 are attached to body part 651A of resonance part 651 and are held by first electrode 653, so that the components are electrically connected to each other. For example, connecting one of the power feeding paths to first electrode 653 and the other to second electrode 654 allows application of a voltage to piezoelectric element 652, thereby generating vibration.

Resonance part 651 has at least two resonance frequencies, and is deformed with different behaviors corresponding to the different resonance frequencies. In other words, resonance part 651 is set to have an overall shape so as to be deformed with different behaviors corresponding to the two resonance frequencies. The different behaviors are as follows: via interposition part 64, moving frame 62 to the + side in the Y direction, and moving frame 62 to the − side in the Y direction.

Figure 16:
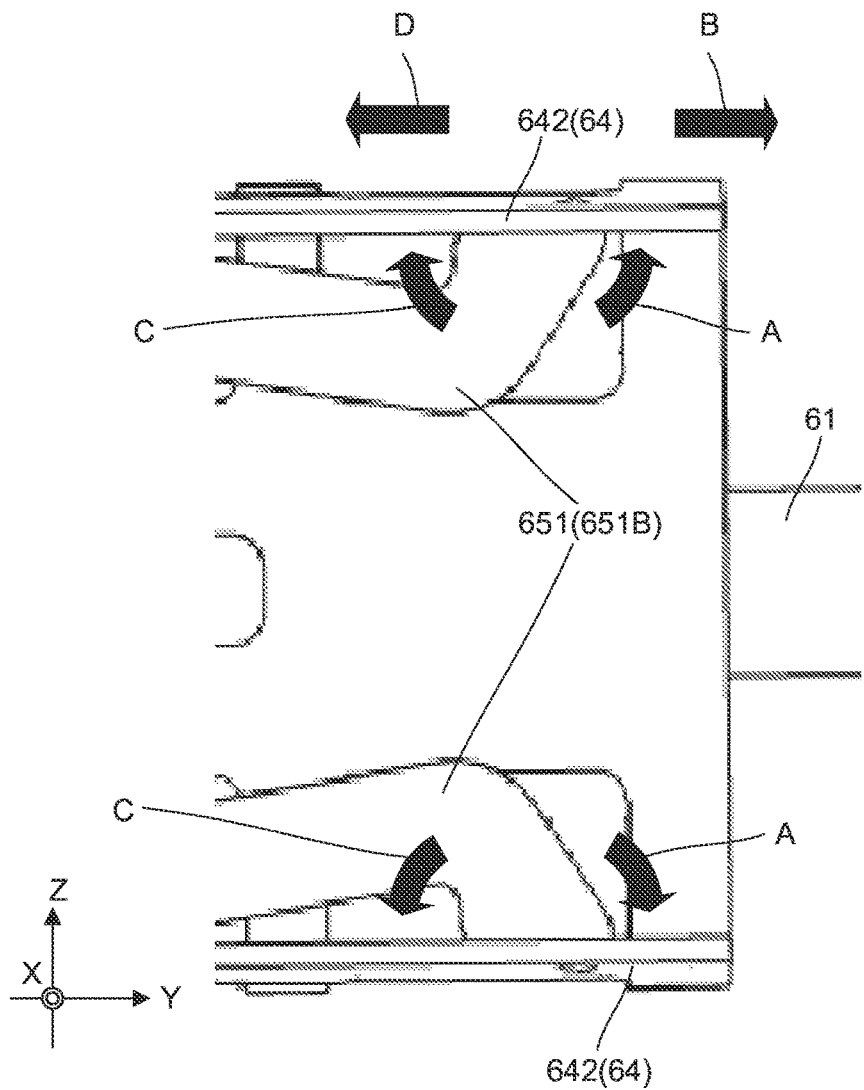
FIG. 16 is an enlarged view of a contact portion between a resonance part and the interposition part.

As illustrated in FIG. 16, resonance part 651 is disposed in such a way that each oscillator 651B faces either one of contact parts 642 of the interposition part 64. Therefore, when two oscillators 651B are deformed, the tip of each oscillator 651B presses corresponding contact part 642 in a direction inclined with respect to the Y direction from the side facing contact part 642 (see arrows A).

When each contact part 642 is pressed in the direction of arrow A by the tip of oscillator 651B, a reaction force that acts to return to oscillator 651B side is generated in each contact part 642. In other words, interposition part 64 generates a reaction force in the direction from the outside to the inside of the pair of contact parts 642 based on the contact between oscillator 651B and corresponding contact part 642. The portion including contact part 642 in interposition part 64 corresponds to the "pressurization part" of the present invention.

The reaction force of interposition part 64 against the pressing of oscillator 651B generates friction between oscillator 651B and contact part 642. The friction generates thrust on interposition part 64 in the Y direction. Accordingly, thrust (see arrow B) for the movement in the Y direction is applied to frame 62 bonded to interposition part 64. As a result, second lens unit 32 or third lens unit 33 connected to frame 62 moves in the Y direction.

In addition, as contact part 642 is formed to extend in the Y direction, contact part 642 moves in the Y direction while making contact with oscillator 651B so as to slide on oscillator 651B when contact part 642 is pressed by oscillator 651B. This configuration allows oscillator 651B to continuously press contact part 642, thereby continuously moving frame 62 bonded to interposition part 64 in the Y direction. While at one resonance frequency, the pressing direction of oscillator 651B is the arrow A direction, and the sliding direction of contact part 642 is the arrow B direction, at another resonance frequency, the pressing direction of oscillator 651B is the arrow C direction, and the sliding direction of contact part 642 is the arrow D direction.

Such a drive operation is performed by each of ultrasonic motors 65 provided on first walls 111 on both sides in the X direction. That is, one of ultrasonic motors 65 independently drives second lens unit 32 in the direction of the optical axis, and the other one of ultrasonic motors 65 independently drives third lens unit 33 in the direction of the optical axis.

When two ultrasonic motors 65 are disposed on the same first wall 111, two frames 62 to be moved should be disposed on this first wall 111 side as well. Such configuration causes frames 62 to interfere with each other to lower the moving range of each frame. As a result, the moving ranges of second lens unit 32 and third lens unit 33 are reduced. Therefore, it is necessary to increase the length of housing 10 in the Y direction in order not to compromise the moving range.

In the present embodiment, meanwhile, two ultrasonic motors 65 are respectively disposed on pair of first walls 111 opposite to each other with respect to the optical axis (i.e., with the optical axis as the center). The space adjacent to each first wall 111 thus can be used as a dedicated range of movement for corresponding one of two frames 62. As a result, the volume of housing 10 can be efficiently used for lens driving parts 60. Therefore, ranges of movement of second lens unit 32 and third lens unit 33 can be increased without increasing the length of housing 10 in the Y direction.

In the present embodiment, increasing the ranges of movement of second lens unit 32 and third lens unit 33 can increase the degree of freedom in selecting each lens. As a result, with respect to the zoom function, the magnification range of lens part 30 can be increased, and with respect to the focus function, the depth of field can be increased.

In the present embodiment, ultrasonic motor 65 configured by attaching thin plate-shaped members such as resonance part 651 and piezoelectric elements 652 to each other is used in lens driving part 60, thus a space for disposing a drive source can be reduced. As a result, camera module 1 (lens driving device) can be downsized as compared with a configuration using a stepping motor or the like as a drive source.

In the present embodiment, ultrasonic motors 65 are provided on both sides with respect to the optical axis. The weight distribution in housing 10 thus can be equalized in the X direction, thereby improving the resistance of the device to vibration, dropping, and the like.

In the present embodiment, guide shafts 50, as well as drive shafts 61, are provided on both sides with respect to the optical axis. It is thus possible to reduce the tilting of second lens unit 32 and third lens unit 33, which are movable parts during driving.

In the present embodiment, the distances from the optical axis to guide shafts 50 are the same (equal to each other) and guide shafts 50 have the same length, and the distances from the optical axis to drive shafts 61 are the same and drive shafts 61 have the same length. The weight balance of the device thus can be equalized in the X direction. As a result, the resistance of the device to vibration, dropping, and the like can be improved.

In the present embodiment, interposition part 64 has a structure such that oscillators 651B of ultrasonic motor 65 are placed between contact parts 642. Contact parts 642 of interposition part 64 pass on both sides in the Z direction of oscillators 651B. That is, the movement of contact part 642 does not interfere with oscillators 651B. As a result, the moving range of interposition part 64 can be increased, and the moving ranges of frame 62 and the movable part can also be increased.

In the present embodiment, the width of connection part 641B in the Y direction (direction of the optical axis) in interposition part 64 increases from connection part 641B at the center toward connection part 641B on the outer side in the Y direction. This configuration can equalize the pressing force applied by oscillator 651B at positions in contact part 642 in the entire Y direction. As a result, during the activation of the stepless optical zoom function in a device mounted in a mobile terminal such as a smartphone, the moving force from interposition part 64 can be stably generated even when the movable part is moved within a relatively long moving range (for example, 8 mm).

In the present embodiment, frame 62 has a length longer than its own movable distance, which can prevent frame 62 from moving in a too long distance. As a result, the operational stability of the device can be improved.

In a configuration with, for example, interposition part 64 protruding from frame 62, when oscillator 651B presses the protruding portion of interposition part 64, the direction of the force applied to interposition part 64 is more likely to change, and frame 62 may be inclined.

In the present embodiment, meanwhile, the length of frame 62 is longer than the length of interposition part 64 (main body part 641). This configuration prevents the change in the direction of the force applied to interposition part 64, and thus improves the operational stability of the device.

In the present embodiment, drive shaft 61 is a non-magnetic or low-magnetic ceramic, which can reduce the influence on the detection accuracy of position detection part 70 that detects the position of frame 62. As a result, the position detection accuracy of position detection part 70 can be improved.

Drive shaft 61 is made of a ceramic material such as zirconia, thus drive shaft 61 can be produced with high accuracy (for example, the diameter accuracy is about ±0.5 μm) even when the outer diameter is reduced to about 0.8 mm. With relatively high Young's modulus thereof, the strength of the drive shaft can also be improved. The drive shaft has sufficient toughness so that the drive shaft can be restored after temporally bent, thus the device can have sufficient resistance even when a relatively heavy glass lens or the like is used in the lens part.

In the present embodiment, drive shaft 61 is supported by second wall 112 and third wall 113, which can improve the strength of housing 10.

In the present embodiment, drive shaft 61, which is closer to the source of the driving force than guide shaft 50 is, is longer than guide shaft 50. Therefore, frame 62 and the lens units can be driven stably and easily. As a result, tilting of parts in the device can be prevented.

When magnet part 621 is composed of one magnet, the boundary portion between different poles includes a region without magnetic force. In such a configuration, position detection part 70 may not be able to detect the position of frame 62 in the region with no magnetic force when the position detecting part passes over the boundary.

In the present embodiment, meanwhile, two magnets 621A and 621B come into contact with each other to form a boundary between different poles in magnet part 621 thus there is no region that has no magnetic force at the boundary portion. As a result, the position detection accuracy of position detection part 70 can be further improved.

In the present embodiment, increasing the moving range of frame 62 allows driving control part 100 to control the drive of second lens unit 32 and third lens unit 33 with a resolution of, for example, 14 bits or more.

With the resolution set to, for example, 12 bits, when frame 62 is moved in a relatively long moving range (for example, 8 mm), the decomposition width of the movement of frame 62 becomes wide. In such a configuration, the device may not be able to finely drive second lens unit 32 and third lens unit 33.

In the present embodiment, controlling with a resolution of 14 bits or more can control the drive of second lens unit 32 and third lens unit 33 more accurately even when frame 62 is moved in a relatively long moving range.

Figure 17:
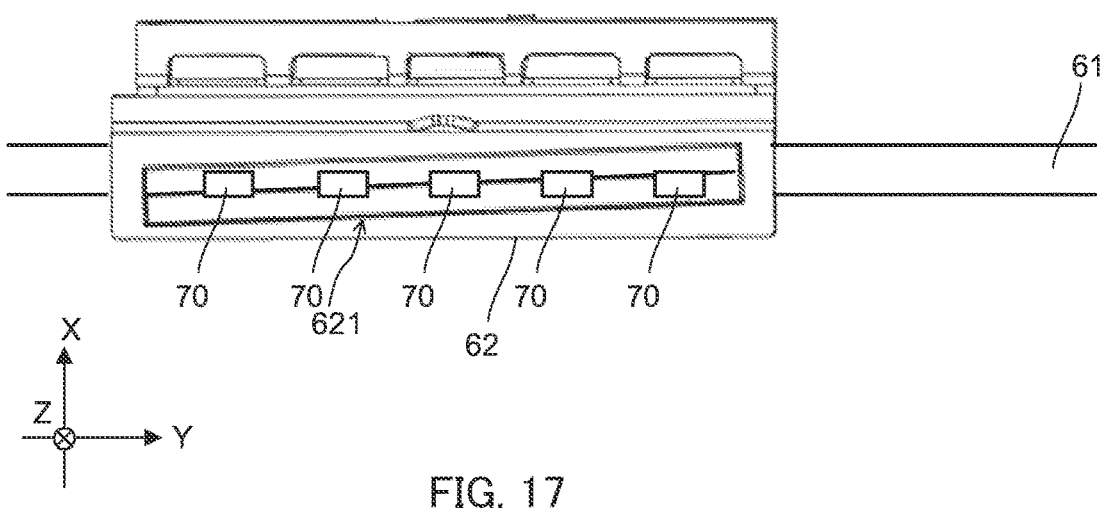
FIG. 17 illustrates a configuration having a plurality of position detection parts.

In the above embodiment, one position detection part 70 is provided in each frame 62, but the present invention is not limited thereto. For example, a plurality of position detection parts 70 may be arranged in the direction of the optical axis (Y direction), as illustrated in FIG. 17. Such a configuration can further improve the accuracy of position detection of frame 62.

In the above embodiment, guide shafts 50 are provided on both sides in the X direction, but the present invention is not limited thereto. Guide shaft 50 may be provided on only one side in the X direction.

In the above embodiment, drive shaft 61 is made of ceramic, but the present invention is not limited thereto. Any other drive shaft made of a material having a relatively small magnetic force may be used.

In the above embodiment, side wall part 11 and bottom wall part 12 in housing 10 are insert-molded, but the present invention is not limited thereto. The bottom wall part may be fixed to side wall part 11 by bonding.

The configuration in the above embodiment has two movable lenses, namely second lens unit 32 and third lens unit 33, but the present invention is not limited thereto. A configuration having three or more movable lenses may be used. In this case, at least one lens driving part is provided on each of the pair of first walls.

The configuration in the above embodiment has four lens units, but the present invention is not limited thereto. Any number of lens units may be provided as long as at least two movable lenses are provided.

In the above embodiment, interposition part 64 is formed by bending a plate-shaped metal member, but the present invention is not limited thereto. Any configuration having the function of a pressurization part may be applied. For example, as long as the contact part generates a reaction force based on the contact of an oscillator, the main body part and the contact part, which constitute the interposition part, may be formed of a different member.

In the above embodiment, frame 62 and interposition part 64 are formed of different members, but the present invention is not limited thereto. For example, frame 62 may be integrally formed with interposition part 64. That is, the lens driving part may have moving parts individually connected to the lens units. Each moving part moves in the direction of the optical axis according to the resonance of the resonance part and transmits the movement in the direction of the optical axis to the corresponding lens unit.

In the above embodiment, connection part 63 connecting frame 62 to a lens unit is composed of a spring member, but the present invention is not limited thereto. Any elastic member may be used for the connection part.

In the above embodiment, the position of frame 62 is detected by using magnet part 621, but the present invention is not limited thereto. The position of the frame may be detected by another method.

In the above embodiment, the bottom wall part includes bent parts and half punches, but the present invention is not limited thereto. A configuration having no bent part and no half punch may be applied.

In the above embodiment, resonance part 651 includes two oscillators 651B, but the present invention is not limited thereto. A configuration having one oscillator may be applied.

In the above embodiment, the driving control part, the reflection driving control part, and the image capturing control part are provided separately, but the present invention is not limited thereto. One control part may include at least two of the driving control part, the reflection driving control part, and the image capturing control part.

While a smartphone serving as a camera-equipped mobile terminal is described in the above embodiment as an example of the camera-mounted device including camera module 1, the present invention is applicable to a camera-mounted device including a camera module and an image processing part that processes image information obtained by the camera module. Examples of such a camera-mounted device include information devices and transporting devices. Examples of the information devices include camera-equipped mobile phones, laptop computers, tablet terminals, mobile game machines, web cameras, drones, and in-vehicle devices with cameras (for example, rear-view monitor devices and drive recorder devices). Examples of the transporting devices includes automobiles and drones.

Figure 19A:
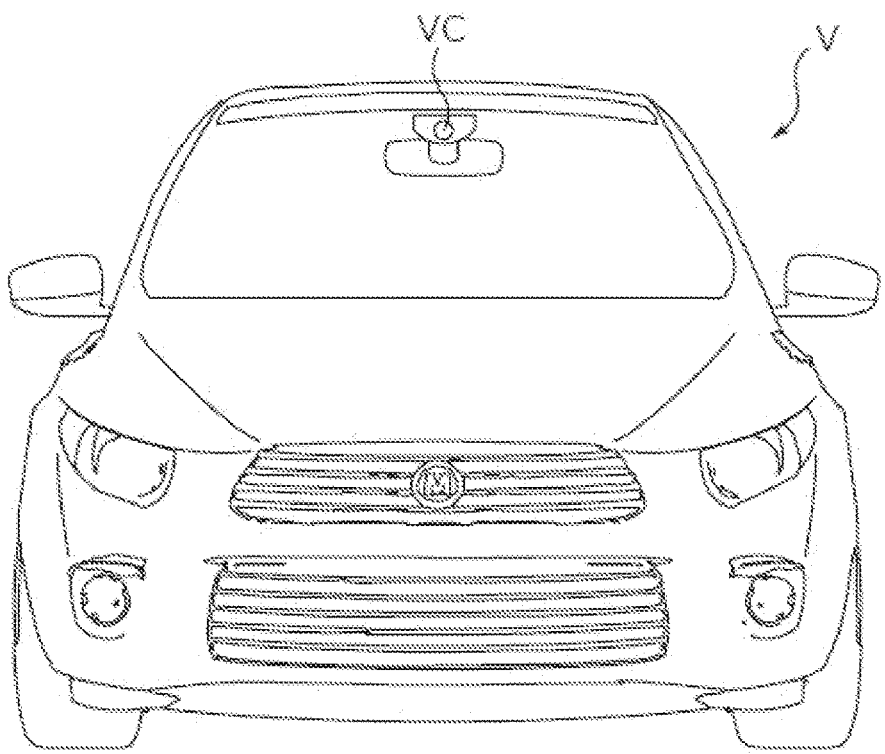
FIG. 19A illustrates an automobile equipped with the camera module.
Figure 19B:
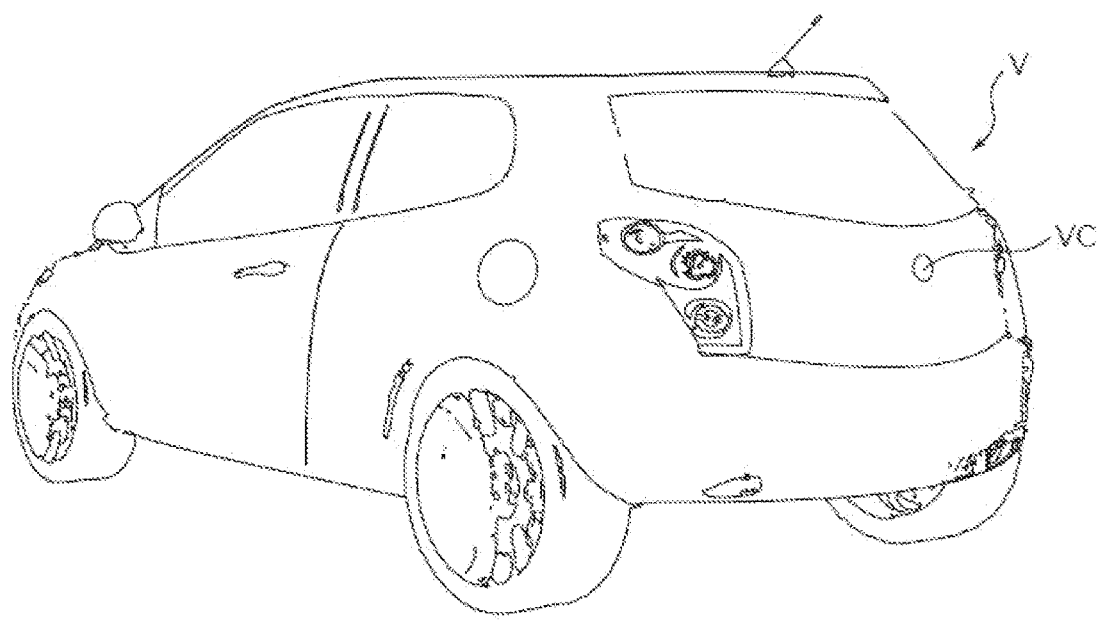
FIG. 19B illustrates the automobile equipped with the camera module.

FIGS. 19A and 19B illustrate automobile V serving as the camera-mounted device equipped with in-vehicle camera module VC (i.e., vehicle camera). FIG. 19A is a front view of automobile V, and FIG. 19B is a rear perspective view of automobile V. Camera module 1 described in the embodiment is mounted in automobile V as in-vehicle camera module VC. As illustrated in FIGS. 19A and 19B, in-vehicle camera module VC is attached, for example, to a windshield to face forward or to a rear gate to face backward. In-vehicle camera module VC is used for rear-view monitoring, drive recording, collision avoidance control, automatic drive control, and the like.

The above embodiments are no more than specific examples in implementing the present invention, and the technical scope of the present invention is not to be construed in a limitative sense due to the specific examples. That is, the present invention can be implemented in a variety of ways without departing from the spirit or essential features thereof. For example, the shape, size, number, and material of each part described in the above embodiments are merely examples, and can be changed as appropriate for implementing the present invention.

This application is entitled to and claims the benefit of Japanese Patent Application No. 2019-236300 filed on Dec. 26, 2019, the disclosure of which including the specification, drawings and abstract is incorporated herein by reference in its entirety.

INDUSTRIAL APPLICABILITY

The lens driving device according to the present invention is particularly advantageous for a lens driving device, camera module, and camera-mounted device that can be downsized while the moving range of a movable lens is not compromised.

REFERENCE SIGNS LIST

1 Camera module
10 Housing
11 Side wall part
12 Bottom wall part
20 Reflection driving part
21 Reflection housing
22 Mirror
23 Reflection driving control part
30 Lens part
31 First lens unit
32 Second lens unit
32A Main body part
32B Supported part
33 Third lens unit
33A Main body part
33B Supported part
34 Fourth lens unit
34A Convex part
40 Image capturing part
50 Guide shaft
60 Lens driving part
61 Drive shaft
62 Frame
63 Connection part
64 Interposition part
65 Ultrasonic motor
70 Position detection part
100 Driving control part
111 First wall
111A Disposition part
111B Engaged part
112 Second wall
112A Guide support part
112B Disposition part
112C Drive support part
112D Opening part
113 Third wall
113A Guide support part
113B Drive support part
114 Fourth wall
121 Positioning part
122 Bent part
123 Half punch
200 Image capturing control part
621 Magnet part
621A Magnet
621B Magnet
621C Facing surface 621D Boundary
641 Main body part
641A Plate-shaped part
641B Connection part
642 Contact part
643 Opening
651 Resonance part
651A Body part
651B Oscillator
651C Protruding part
651D Energizing part
652 Piezoelectric element
653 First electrode
653A Sandwiching part
653B Electrode part
654 Second electrode

The invention claimed is:

1. A lens driving device, comprising:
a first movable part and a second movable part arranged in a direction of an optical axis, wherein the first movable part is capable of holding a first movable lens, and the second movable part is capable of holding a second movable lens; and
a first driving part and a second driving part that respectively drive the first movable part and the second movable part in the direction of the optical axis,
wherein:
the first driving part and the second driving part respectively include a first ultrasonic motor and a second ultrasonic motor, the first ultrasonic motor and the second ultrasonic motor are disposed so as to be opposite to each other with respect to the optical axis, the first ultrasonic motor independently drives the first movable part in the direction of the optical axis, and the second ultrasonic motor independently drives the second movable part in the direction of the optical axis;
the first driving part includes a first frame and a first drive shaft both disposed on the side on which the first ultrasonic motor is disposed with respect to the optical axis;
the first frame is connected to the first movable part;
the second driving part includes a second frame and a second drive shaft both disposed on the side on which the second ultrasonic motor is disposed with respect to the optical axis; and
the second frame is connected to the second movable part.

2. The lens driving device according to claim 1, further comprising:
a guide part disposed on both sides on which the first ultrasonic motor and the second ultrasonic motor are respectively disposed with respect to the optical axis, wherein the guide part supports the first movable part and the second movable part on the both sides in such a way that the first movable part and the second movable part are movable in the direction of the optical axis.

3. The lens driving device according to claim 1, wherein:
the first drive shaft supports the first frame in such a way that the first frame is movable in the direction of the optical axis; and
the second drive shaft supports the second frame in such a way that the second frame is movable in the direction of the optical axis.

4. The lens driving device according to claim 1, further comprising:
a housing that houses at least the first movable part, the second movable part, the first driving part, and the second driving part, wherein
the housing includes
a pair of wall parts extending in the direction of the optical axis on both sides on which the first ultrasonic motor and the second ultrasonic motor are respectively disposed with respect to the optical axis, and
a metal plate bridging the pair of wall parts.

5. The lens driving device according to claim 4, wherein:
the metal plate bridges bottom parts of the pair of wall parts; and
an end of the metal plate is bent toward the pair of wall parts, the end being located on a light incident side in the direction of the optical axis.

6. The lens driving device according to claim 4, wherein:
the pair of wall parts are made of resin; and
the metal plate is integrated by insert molding with the pair of wall parts.

7. The lens driving device according to claim 4, wherein:
each of the pair of wall parts is disposed at a predetermined distance from the optical axis; and
the first ultrasonic motor and the second ultrasonic motor are respectively provided on the pair of wall parts.

8. The lens driving device according to claim 1, wherein:
each of the first ultrasonic motor and the second ultrasonic motor includes a vibration element that generates vibration by applying a high frequency voltage, and a resonance part that causes a resonance according to the vibration of the vibration element so that the resonance part vibrates in an inclined direction inclined with respect to the direction of the optical axis; and
the first driving part includes a moving part connected to the first movable part and the second driving part includes a moving part connected to the second movable part in such a way that each of the moving parts performs movement in the direction of the optical axis according to the resonance of the resonance part and transmits the movement in the direction of the optical axis to a corresponding one of the first movable part and the second movable part.

9. A camera module, comprising:
the lens driving device according to claim 1;
a lens part that includes the first movable lens held by the first movable part and the second movable lens held by the second movable part; and
an image capturing part that captures a subject image formed by the lens part,
wherein
the camera module drives the first movable lens and the second movable lens in the direction of the optical axis.

10. A camera-mounted device that is an information device or a transporting device, the camera-mounted device comprising:
the camera module according to claim 9; and
an image capturing control part that processes image information obtained by the camera module.

11. A lens driving device, comprising:
a first movable part and a second movable part arranged in a direction of an optical axis, wherein the first movable part is capable of holding a first movable lens, and the second movable part is capable of holding a second movable lens;
a first driving part and a second driving part that respectively drive the first movable part and the second movable part in the direction of the optical axis; and a housing that houses at least the first movable part, the second movable part, the first driving part, and the second driving part, wherein:

the first driving part and the second driving part respectively include a first ultrasonic motor and a second ultrasonic motor, the first ultrasonic motor and the second ultrasonic motor are disposed so as to be opposite to each other with respect to the optical axis, the first ultrasonic motor independently drives the first movable part in the direction of the optical axis, and the second ultrasonic motor independently drives the second movable part in the direction of the optical axis; and the housing includes a pair of wall parts extending in the direction of the optical axis on both sides on which the first ultrasonic motor and the second ultrasonic motor are respectively disposed with respect to the optical axis, and a metal plate bridging the pair of wall parts.

12. The lens driving device according to claim 11, wherein:

the metal plate bridges bottom parts of the pair of wall parts; and an end of the metal plate is bent toward the pair of wall parts, the end being located on a light incident side in the direction of the optical axis.

13. The lens driving device according to claim 11, wherein:

the pair of wall parts are made of resin; and the metal plate is integrated by insert molding with the pair of wall parts.

14. The lens driving device according to claim 11, wherein:

each of the pair of wall parts is disposed at a predetermined distance from the optical axis; and the first ultrasonic motor and the second ultrasonic motor are respectively provided on the pair of wall parts.

15. The lens driving device according to claim 11, wherein:

each of the first ultrasonic motor and the second ultrasonic motor includes a vibration element that generates vibration by applying a high frequency voltage, and a resonance part that causes a resonance according to the vibration of the vibration element so that the resonance part vibrates in an inclined direction inclined with respect to the direction of the optical axis; and the first driving part includes a moving part connected to the first movable part and the second driving part includes a moving part connected to the second movable part in such a way that each of the moving parts performs movement in the direction of the optical axis according to the resonance of the resonance part and transmits the movement in the direction of the optical axis to a corresponding one of the first movable part and the second movable part.

16. A camera module, comprising:

the lens driving device according to claim 11;

a lens part that includes the first movable lens held by the first movable part and the second movable lens held by the second movable part; and an image capturing part that captures a subject image formed by the lens part, wherein the camera module drives the first movable lens and the second movable lens in the direction of the optical axis.

17. A camera-mounted device that is an information device or a transporting device, the camera-mounted device comprising:

the camera module according to claim 16; and an image capturing control part that processes image information obtained by the camera module.

18. A lens driving device, comprising:

a first movable part and a second movable part arranged in a direction of an optical axis, wherein the first movable part is capable of holding a first movable lens, and the second movable part is capable of holding a second movable lens; and a first driving part and a second driving part that respectively drive the first movable part and the second movable part in the direction of the optical axis, wherein:

the first driving part and the second driving part respectively include a first ultrasonic motor and a second ultrasonic motor, the first ultrasonic motor and the second ultrasonic motor are disposed so as to be opposite to each other with respect to the optical axis, the first ultrasonic motor independently drives the first movable part in the direction of the optical axis, and the second ultrasonic motor independently drives the second movable part in the direction of the optical axis;

each of the first ultrasonic motor and the second ultrasonic motor includes a vibration element that generates vibration by applying a high frequency voltage, and a resonance part that causes a resonance according to the vibration of the vibration element so that the resonance part vibrates in an inclined direction inclined with respect to the direction of the optical axis;

the first driving part includes a moving part connected to the first movable part and the second driving part includes a moving part connected to the second movable part in such a way that each of the moving parts performs movement in the direction of the optical axis according to the resonance of the resonance part and transmits the movement in the direction of the optical axis to a corresponding one of the first movable part and the second movable part; and the moving parts respectively include a first frame and a second frame that are supported so as to be movable in the direction of the optical axis, and the moving parts respectively include a first interposition part and a second interposition part, each of the first interposition part and the second interposition part being disposed in contact with the corresponding resonance part so as to slide in the direction of the optical axis by being pressed from the resonance part in the inclined direction, the first interposition part and the second interposition part being respectively fixed to the first frame and the second frame, wherein the first frame is connected to the first movable part via a first elastic member, and the second frame is connected to the second movable part via a second elastic member.

19. A camera module, comprising:

the lens driving device according to claim 18;

a lens part that includes the first movable lens held by the first movable part and the second movable lens held by the second movable part; and an image capturing part that captures a subject image formed by the lens part, wherein
the camera module drives the first movable lens and the second movable lens in the direction of the optical axis.

20. A camera-mounted device that is an information device or a transporting device, the camera-mounted device comprising:
the camera module according to claim 19; and
an image capturing control part that processes image information obtained by the camera module.

* * * * *